United States Patent
Singh

(10) Patent No.: US 11,289,229 B2
(45) Date of Patent: Mar. 29, 2022

(54) NUCLEAR FUEL STORAGE SYSTEM WITH INTEGRAL SHIMMING

(71) Applicant: HOLTEC INTERNATIONAL, Camden, NJ (US)

(72) Inventor: Krishna P. Singh, Jupiter, FL (US)

(73) Assignee: HOLTEC INTERNATIONAL

( * ) Notice: Subject to any disclaimer, the term of this patent is extended or adjusted under 35 U.S.C. 154(b) by 0 days.

(21) Appl. No.: 17/115,005

(22) Filed: Dec. 8, 2020

(65) Prior Publication Data
US 2021/0272713 A1    Sep. 2, 2021

Related U.S. Application Data

(60) Provisional application No. 62/945,587, filed on Dec. 9, 2019.

(51) Int. Cl.
*G21F 5/00* (2006.01)
*G21F 5/06* (2006.01)
*G21F 5/015* (2006.01)

(52) U.S. Cl.
CPC ............ *G21F 5/015* (2013.01); *G21F 5/06* (2013.01)

(58) Field of Classification Search
CPC .................................. G21F 5/015; G21F 5/06
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | | |
|---|---|---|---|---|
| 4,525,634 A | * | 6/1985 | Southard | H01H 47/00 307/115 |
| 4,526,534 A | * | 7/1985 | Wollmann | F27B 5/02 219/390 |
| 4,566,302 A | * | 1/1986 | Suvanto | G21F 9/34 241/232 |
| 5,114,666 A | | 5/1992 | Ellingson et al. | |
| 8,712,001 B2 | | 4/2014 | Singh et al. | |
| 9,001,958 B2 | | 4/2015 | Singh et al. | |
| 10,192,647 B2 | | 1/2019 | Babinet et al. | |
| 2004/0207530 A1 | * | 10/2004 | Nielsen | A61F 13/42 340/604 |

(Continued)

FOREIGN PATENT DOCUMENTS

EP         3042378 B1    8/2017
WO    WO2008030987 A2    3/2008

*Primary Examiner* — Nicole M Ippolito
(74) *Attorney, Agent, or Firm* — The Belles Group, P.C.

(57) ABSTRACT

A nuclear fuel storage system includes an outer canister and fuel basket positioned therein. The basket is formed by orthogonally arranged and interlocked slotted plates which collectively define exterior side surfaces of the basket and a grid array of open cells each configured to hold a fuel assembly. At least some slotted plates comprise cantilevered plate extensions protruding laterally beyond the side surfaces of the basket to define various shaped peripheral gaps between the basket and canister. The plate extensions are configured to engage the shell of the canister. Vertically elongated reinforcement members are inserted in the peripheral gaps and fixedly coupled to the basket. Reinforcement members may comprise elongated reinforcement plates and/or tubular shimming members which may be fixedly coupled to the slotted plate extensions. The reinforcement members structurally strengthen the fuel basket. The plate extensions further act as fins to enhance heat dissipation from the basket.

24 Claims, 21 Drawing Sheets

(56) References Cited

U.S. PATENT DOCUMENTS

| | | |
|---|---|---|
| 2008/0123798 A1 | 5/2008 | Andre et al. |
| 2011/0108746 A1 | 5/2011 | Bara et al. |
| 2013/0322589 A1 | 12/2013 | Bracey et al. |
| 2017/0229199 A1 | 8/2017 | Delage et al. |
| 2017/0345520 A1* | 11/2017 | Singh .................. G21F 5/06 |
| 2018/0122527 A1 | 5/2018 | Singh et al. |

* cited by examiner

NUCLEAR FUEL STORAGE SYSTEM WITH INTEGRAL SHIMMING

CROSS-REFERENCE TO RELATED APPLICATIONS

This application claims the benefit of U.S. Provisional Application No. 62/945,587 filed Dec. 9, 2019, which is incorporated herein by reference in its entirety.

BACKGROUND

The present invention relates generally to systems and apparatuses for storing high level radioactive waste such as used or spent nuclear fuel (SNF), and more particularly to an improved system comprising a nuclear fuel basket with integral shims.

In the operation of nuclear reactors, the nuclear energy source is in the form of hollow Zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a cylindrical metallic fuel storage canister, which is often referred to as a multi-purpose canister (MPC) that forms the primary nuclear waste containment barrier. Such MPCs are available from Holtec International of Camden, N.J. The fuel assemblies are typically loaded into the canister while submerged in the spent fuel pool of the reactor containment structure to minimize radiation exposure to personnel.

The typical prismatic structure of the fuel basket used to store the SNF comprises openings or cells; each of which houses a single fuel assembly as previously noted. The cells have a square cross-sectional shape to match the configuration of U.S. type PWR (Pressurized Water Reactor) fuel assemblies. The fuel basket walls may be made by stacking and mechanically interlocking slotted plates together which are arranged in an orthogonal pattern to achieve the desired height. All of the exterior plates are typically welded together to structurally stabilize the stack. The resultant cells may have a square cross-sectional shapes to match the configuration of U.S. type PWR (Pressurized Water Reactor) fuel assemblies. FIGS. 1 and 2A show a typical fuel basket structure having a plurality of undulating planar stepped side walls surfaces formed by the exterior outboard slotted plates. The basket has a compound rectilinear polygonal prismatic perimeter in top down view; however, the nuclear waste canister has a circular shell wall causing a profile mismatch. Accordingly, some means is required to compensate for dimensional and profile differences at the peripheral fuel basket to canister interface in order to center and stabilize the basket within the canister for handling and transport without damaging the fuel assemblies contained therein.

In one prior approach, the fuel basket is first positioned inside the metallic cylindrical canister and thereafter laterally centered therein by multiple so-called "loose" extruded basket shims. FIG. 2B shows such loose basket shims comprise multiple individual tubular extrusions of various complex and compound cross-sectional shapes each forming an enclosed central cavity or space. The extrusions are inserted into the many differently configured lateral gaps or pockets formed between the stepped lateral exterior surfaces of the fuel basket and the cylindrical inner surface of the canister. The entire peripheral gap is typically filled with the loose shims as shown, requiring many individual and custom made cross-sectional shapes of shim tubes to achieve this as shown.

The prior use of unattached extruded loose shim tubes alone however has several fabrication and performance drawbacks. First, the fuel basket rejects the decay heat emitted by the used or spent nuclear fuel assemblies to the outer canister shell via the loose basket shims which serve as a heat conduction bridge. In theory, the heated canister shell in turn then emits the heat to the immediate surrounding environment to cool the canister and fuel assemblies. Without direct coupling of the tubular shims to fuel basket plates, however, thermal conduction is not as effective as desired.

The tubular shaped shim extrusions with solid walls further block a straight line of sight between the exterior surfaces of the fuel basket and the interior surface of the cylindrical canister. This blocks a radiant heat transfer path from the basket directly to the canister, which detrimentally reduces overall heat transfer effectiveness required to cool the fuel assemblies to prevent their structural degradation. Accordingly, because the heat rejection rate is limited by the loose extruded shims and the canister diameter is standardized to fit within a radiation shielded overpack or cask, a restriction is imposed on the size of the fuel basket and concomitantly the number of fuel assemblies which can be stored therein to keep the assembles from overheating.

Secondly, as is further apparent in FIG. 2B, multiple sizes of shims with various cross-sectional shapes must be fabricated to accommodate both different diameter fuel baskets (i.e. lateral width dimensions in all lateral directions), and the many differently configured cross-sectional shaped gaps formed between the basket periphery and canister. Such a full set of shims of various dimensions and shapes for a single basket and canister assembly are obviously quite costly to manufacture.

Finally, the "loose" extruded tubular shims do not structurally reinforce or stiffen the fuel basket itself because there is no solid fixation of the shims to the slotted plate walls of the basket. When the basket is therefore lifted and handled for insertion into the fuel canister, the basket is susceptible to damage if banged against the canister or outright dropped to the floor.

Accordingly, there remains a need for improvements in supporting, stabilizing, and centering fuel baskets in SNF canisters.

BRIEF SUMMARY

The present application discloses a nuclear fuel storage system including a canister and fuel basket with integral fuel basket shimming system. The present system is economical to manufacture and overcomes the drawbacks of using the foregoing prior individual "loose" shims alone to fill the many different size and shaped peripheral gaps formed between the fuel basket exterior side surfaces and the cylindrical fuel storage canister. The present basket shimming system advantageously provides a mechanical support system which directly reinforces the fuel basket structurally separate from the canister to avoid damage when inserting the basket therein, and laterally centers and stabilizes the basket in the canister to resist movement and damage during seismic events.

In addition, the present integral fuel basket shimming system improves the nuclear fuel assembly heat rejection rate by providing unobstructed straight lines of sight between the lateral exterior side surfaces of the fuel basket and the canister shell for efficient radiant heat transfer. This direct radiant heat rejection path established between the fuel basket and canister advantageously protects the structural integrity of the fuel assemblies better. Moreover, larger capacity fuel baskets holding a greater number of fuel assemblies can accordingly be stored in a single canister due to the improved heat rejection rates obtainable.

In one implementation, a fuel basket incorporating the present shimming system generally comprises a plurality of interlocked and orthogonally intersecting slotted plates. The plates are built up in horizontal tiers or rows to the desired height of the fuel basket. At least some slotted plates comprise cantilevered lateral plate extensions on the ends which protrude perpendicularly beyond the flat lateral walls and exterior peripheral surfaces of the adjoining plate on the sides of the basket. The vertical edge surfaces of the ends of the plate extensions are configured to terminate proximate to or abut the interior surface of the cylindrical canister. This restricts lateral movement of the fuel basket within the fuel storage canister in the case of a seismic event or if dropped during handling such as insertion of the canister into a radiation shielded outer transfer or storage cask.

A plurality of differently configured lateral peripheral pockets, spaces, or gaps is formed between the exterior walls of the fuel basket and canister shell. In one embodiment, vertically elongated reinforcement members are disposed in at least some of the gaps. The reinforcement members are fixedly coupled directly to the fuel basket, and more specifically in some constructions to the slotted plate extensions that define part of peripheral gaps in conjunction with the circular arcuate interior surfaces of the canister. The reinforcement members may have a height coextensive with the height of the fuel basket. In certain embodiments, the reinforcement members may comprise reinforcement plates or a combination of reinforcement plates and tubular shim members both of which are fixedly coupled directly to the cantilevered basket plate extensions. This provides structural reinforcement of the fuel basket plate extensions and in turn the overall fuel basket structure in both the lateral direction and vertical direction if subjected to compression forces in the event the basket were dropped on its end during insertion into the canister, or if the canister were similarly dropped after the basket is in place. The structural integrity of the fuel assemblies contained the fuel basket is therefore better protected overall.

The bottom edges of some or all of the lateral plate extensions and reinforcement members may further comprise flow cutouts or holes where the edges abuttingly engage the bottom closure plate of the canister. This allows the inert gas (e.g. helium or other inert gas) which fills the hermetically sealed cavity of the canister and protectively blankets the fuel assemblies therein to recirculate up and down via natural convective thermosiphon action driven by the gravity and the heat emitted from the decaying fuel assemblies. The peripheral spaces or gaps between the fuel basket and cylindrical shell of the canister act as a gas flow downcomer of the gas recirculation circuit which is in fluid communication with the riser space formed inside the fuel basket through the nuclear fuel assemblies via the flow cutouts.

According to one aspect, a nuclear fuel storage system comprises: a canister comprising a cylindrical shell extending along a vertical centerline; a fuel basket positioned in the canister, the fuel basket formed by a plurality of orthogonally arranged and interlocked slotted plates which collectively define exterior side surfaces of the fuel basket; the fuel basket comprising a plurality of interior cells being defined by the slotted plates, each interior cell configured to hold a fuel assembly comprising spent nuclear fuel; at least some of the slotted plates comprising cantilevered plate extensions, the plate extensions protruding laterally beyond the exterior side surfaces of the fuel basket and defining peripheral gaps between the fuel basket and the canister; wherein the plate extensions are configured to engage the shell of the canister.

According to another aspect, a nuclear fuel storage system comprises: a canister comprising a cylindrical shell extending along a vertical centerline; a fuel basket positioned in the canister, the fuel basket defining a grid array of interior cells each of which is configured to hold a fuel assembly comprising spent nuclear fuel; the fuel basket comprising a plurality cantilevered plate extensions, the plate extensions protruding laterally beyond vertical exterior side surfaces of the fuel basket and defining peripheral gaps between the fuel basket and the canister; and a plurality of vertically elongated reinforcement members positioned in the peripheral gaps, the reinforcement members each being fixedly coupled to the plate extensions.

According to another aspect, a method for forming a structurally reinforced fuel basket for storing nuclear fuel comprises: providing a fuel basket comprising a plurality of vertically stacked and interlocked slotted plates collectively defining a plurality of vertical exterior sidewalls, a plurality of lateral plate extensions protruding laterally outward beyond the exterior sidewalls, and a plurality of storage cells each of which is configured to hold a fuel assembly comprising spent nuclear fuel; fixedly coupling a plurality of vertically elongated reinforcement members to the plate extensions; and inserting the fuel basket with coupled reinforcement members into an upwardly cavity of a cylindrical nuclear fuel storage canister. In some embodiment, the fixedly coupling step includes bolting the reinforcement members to the lateral plate extensions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which:

FIG. 18 is a top plan view of the present canister and fuel basket of FIG. 14A.

Figure 1:
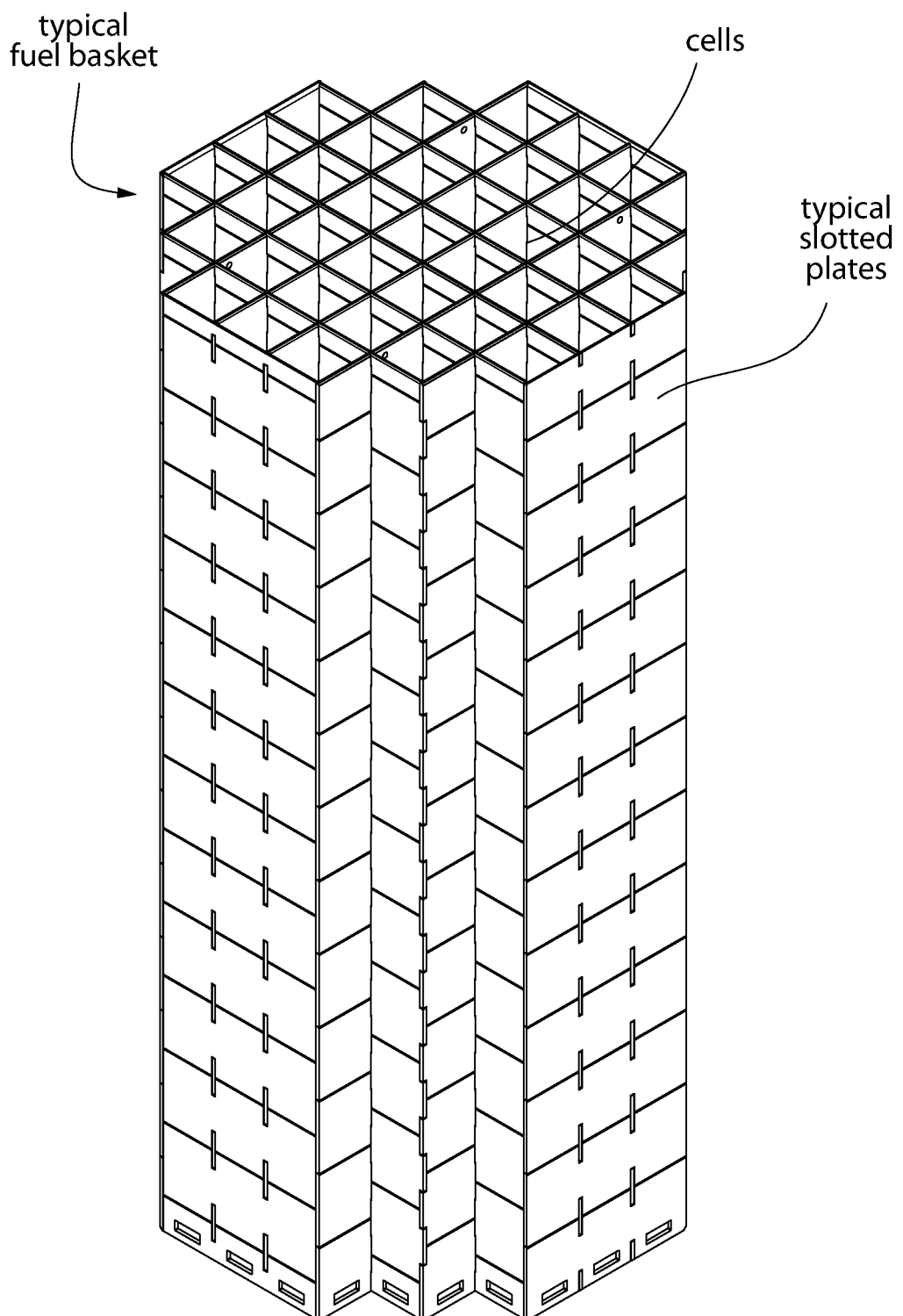
FIG. 1 is a perspective view of a prior nuclear fuel basket.

All drawings are schematic and not necessarily to scale. Features shown numbered in certain figures which may appear un-numbered in other figures are the same features unless noted otherwise herein. A general reference herein to a figure by a whole number which includes related figures sharing the same whole number but with different alphabetical suffixes shall be construed as a reference to all of those figures unless expressly noted otherwise.

DETAILED DESCRIPTION

The features and benefits of the invention are illustrated and described herein by reference to non-limiting exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

As used herein, the terms "seal weld or welding" if used herein shall be construed according to its conventional meaning in the art to be a continuous weld which forms a gas-tight joint between the parts joined by the weld.

FIGS. 3-8 depict a nuclear fuel canister 100 with a first embodiment of a nuclear fuel basket 200 comprising of a hybrid integral shimming system according to the present disclosure for centering, supporting, and reinforcing the basket structure. The shimming system utilizes a plurality of reinforcement members including a combination of reinforcement plates 250 and tubular shim members 260 all fixedly coupled to the fuel basket as further described in detail below. This contrasts to the use of prior "loose" basket shims which are not affixed to the fuel basket and therefore do not structural reinforce the fuel basket outside of the canister. The present reinforcement members are positioned in some, but not necessarily all peripheral pockets or gaps G formed between the fuel basket and the canister. The reinforcement plates 250 may generally have a smaller more compact cross-sectional profile allowing them to be used in tighter/smaller peripheral gaps, whereas the tubular shim members 260 with larger cross-sectional profiles can be used in the larger gaps.

Canister 100 may be used for storing any type of high level radioactive nuclear waste, including without limitation spent nuclear fuel (SNF) or other forms of radioactive waste materials removed form the reactor. The SNF canister 100 may be any commercially-available nuclear fuel/waste storage canister, such as a multi-purpose canister (MPC) available from Holtec International of Camden, N.J. or other.

Canister 100 has a vertically elongated and metallic body a cylindrical shell 101 extending along a vertical centerline Vc which passes through the geometric center of the shell. Canister 100 includes a bottom closure plate 102 seal welded to a bottom end of the shell, and a top closure plate 103 seal welded to a top end of the shell. A hermetically sealed cavity 104 is therefore formed inside the canister such as via seal welding the closure plates to the shell ends. The foregoing canister parts may be formed of any suitable metal, such as for example without limitation steel including stainless steel for corrosion protection.

Fuel basket 200 is a honeycomb prismatic structure which comprises a top 230, bottom 231, and plurality of stepped and rectilinear shaped peripheral sides 232 defining exterior sidewalls 232A extending vertically therebetween. The structure of the fuel basket 200 is formed by a plurality of the interlocked and orthogonally intersecting slotted plates 210. Slotted plates 210 are horizontally elongated in length each having a length (measure transversely to vertical centerline Vc) substantially greater than their height (e.g. at least 4 times the height or more). Peripheral sides 232 of the outermost exterior slotted plates 210 define outward facing exterior peripheral side surfaces 233 which are collectively formed by the slotted plates 202. Plates 210 may be continuous monolithic structures which extend diametrically/laterally from one side of the canister 100 to the opposite side as shown. The elongated slotted plates 210 each define a centerline longitudinal axis LA extending along the length of the plate.

Figure 13A:
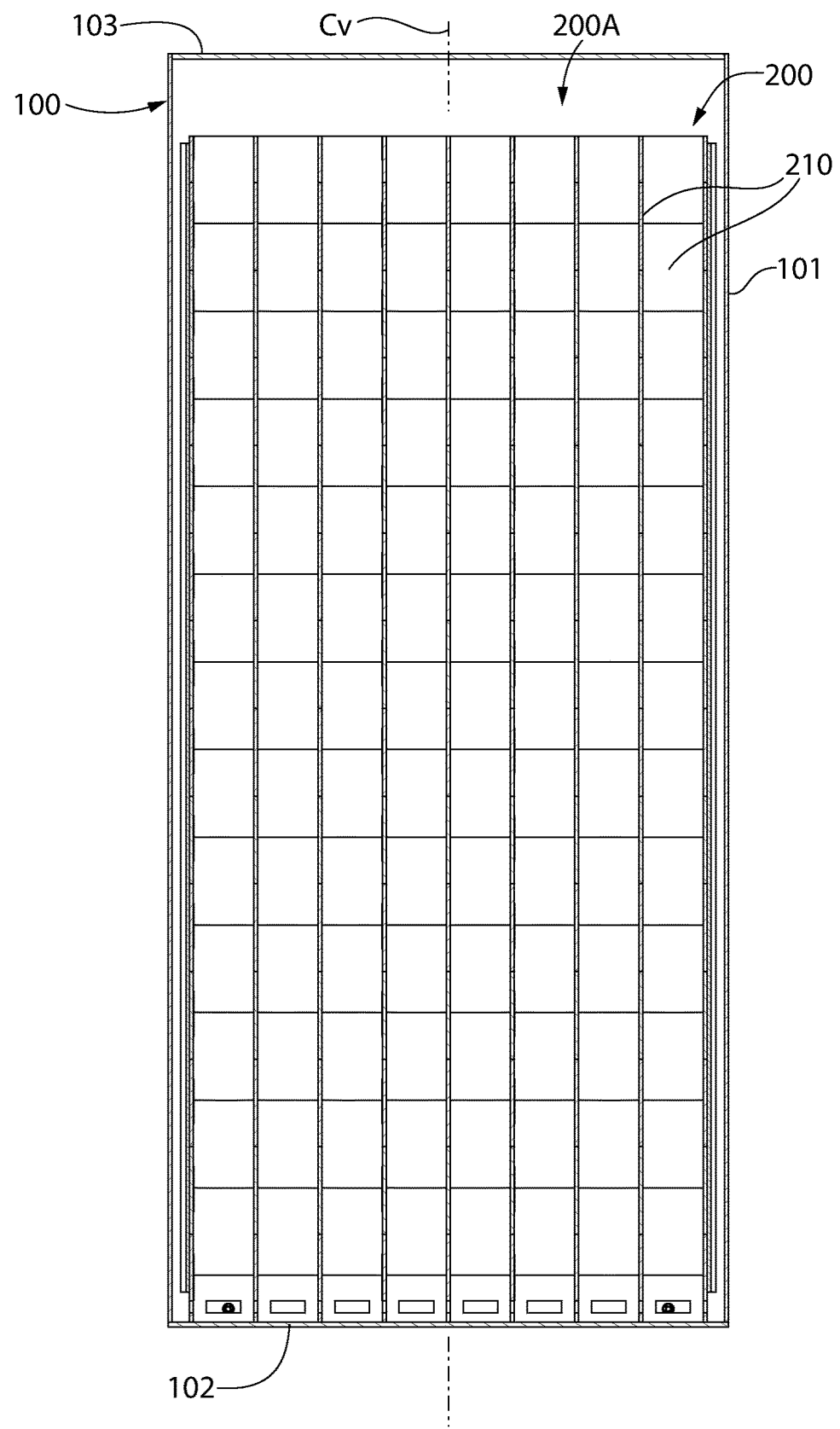
FIG. 13A is a vertical cross-sectional view taken from FIG. 12.

In one embodiment, slotted plates 210 each include flat and parallel opposing vertical major sides surfaces 211, 212, a top longitudinal edge 213, bottom longitudinal edge 214, and opposing ends 215 defining peripheral side edges 217 of the plates. To interlock the plates, a plurality of longitudinally spaced apart vertical slots 216 are formed perpendicularly to longitudinal axis LA in the top longitudinal edge, bottom longitudinal edge, or both of each (depending on the location of the plate in the fuel basket 200). The plates are oriented horizontally/laterally and interlocked with each other via the slots 216 to form a stacked structure comprised of multiple horizontal rows or tiers of plates rising and stacked to the desired height of the fuel basket. The fuel basket may be slightly shorter than the canister 100 in height such that an upper flow plenum 200A is formed between top 230 of the basket and the canister top closure plate 103 (see, e.g. FIGS. 13A-B), which is further described herein. The uppermost plates 210A from the top tier comprise only downwardly open slots 216, the lowermost plates 210C from the bottom tier comprise only upwardly bottom slots 216, and those intermediate plates 210B in middle tiers therebetween comprise both top and bottom slots 216. As shown, the slots 216 extend only partially through the entire height H1 of the slotted plates, approximately 50% or less of height H1 in some embodiments. The plates 210A-C may have the same or different heights and lengths depending on their location with the fuel basket structure.

Figure 19:
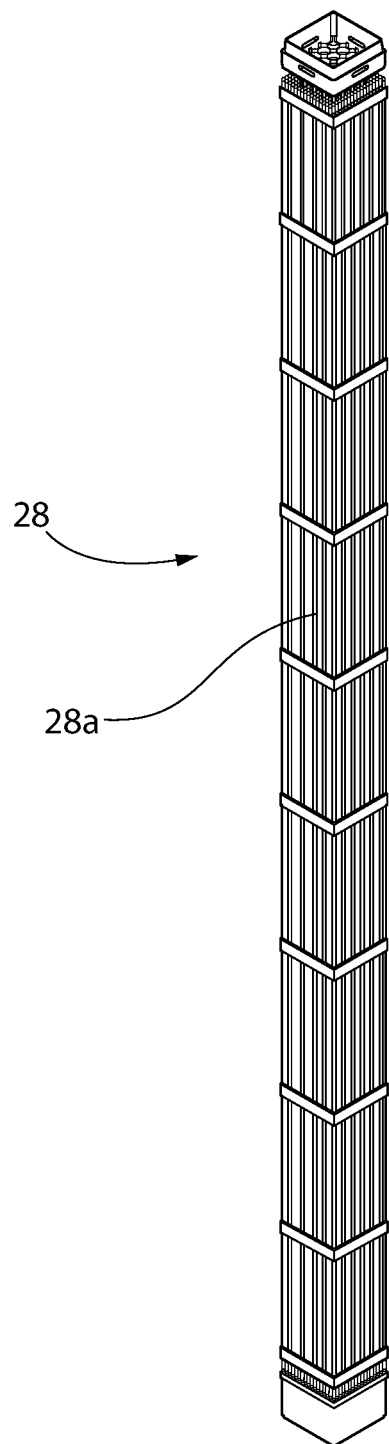
FIG. 19 is a perspective view of a nuclear fuel assembly usable in the fuel baskets of FIGS. 5A, 9A, and 14A.

Fuel basket 200 includes a grid array of plural vertically-extending fuel assembly storage cells 240 in its interior. Each cell is configured in cross-sectional area and shape to hold a single U.S. style fuel assembly 28, which contains multitude of spent nuclear fuel rods 28a (or other nuclear waste). An exemplary fuel assembly of this type having a conventional rectilinear cross-sectional configuration is shown in FIG. 19. Such fuel assemblies are well known in the industry. The cells 240 of the fuel basket are defined by the orthogonally intersecting slotted plates 210, and therefore a concomitantly rectilinear cross-sectional shape (e.g. square). This gives the fuel basket an overall compound rectilinear polygonal shape in transverse cross section as shown which includes multi-faceted and stepped exterior peripheral side surfaces 233 collectively defined by the flat lateral peripheral sidewalls 232A of the outermost exterior slotted plates 210.

A plurality of peripheral spaces or gaps G are formed around the perimeter of the fuel basket 200 between the peripheral sidewalls 232A and interior surface 110 of the fuel canister 100. The gaps G extend vertical for the full height of the fuel basket in the canister. As shown for example in FIG. 8 et al., the gaps G vary in size and configuration, but generally have the same compound arcuate shape on the outermost portion attributed to the cylindrical canister shell 101, and a rectilinear shape on the innermost portions attributed to the fuel basket geometry which collectively define the gaps.

To laterally stabilize and center the fuel basket 200 in the canister 100, and compensate for the mismatch between the rectilinear polygonal exterior peripheral side surfaces 233 of fuel basket 200 and non-polygonal and circular arcuate interior surface 110 of canister 100, at least some of the slotted plates 200 comprise a cantilevered lateral plate extension 220 formed on one or preferably both ends. When the slotted plate are interlocked and assembled into the final fuel basket assembly, the lateral plate extensions 220 protrude perpendicularly and laterally outward beyond the flat outwardly facing exterior peripheral side surfaces 233 of the adjoining plate which is oriented perpendicularly to the extension (see, e.g. FIGS. 5B and 8). It bears noting that the vertical end surfaces of the plate extensions 220 define the plate ends 215 and concomitantly peripheral side edges 217 of the slotted plates 210 previously described herein. The peripheral side edges of the extensions are configured to terminate proximate to or abut the interior surface of the cylindrical shell 101 of canister 100. This ensures contact between the slotted plates and canister shell to stabilize the fuel basket 200 in the lateral direction during the occurrence of a seismic event which can shake the fuel canister 100 and nuclear fuel assemblies 28 therein. It bears noting that not all slotted plates 210 necessarily require plate extensions 220.

Figure 2A:
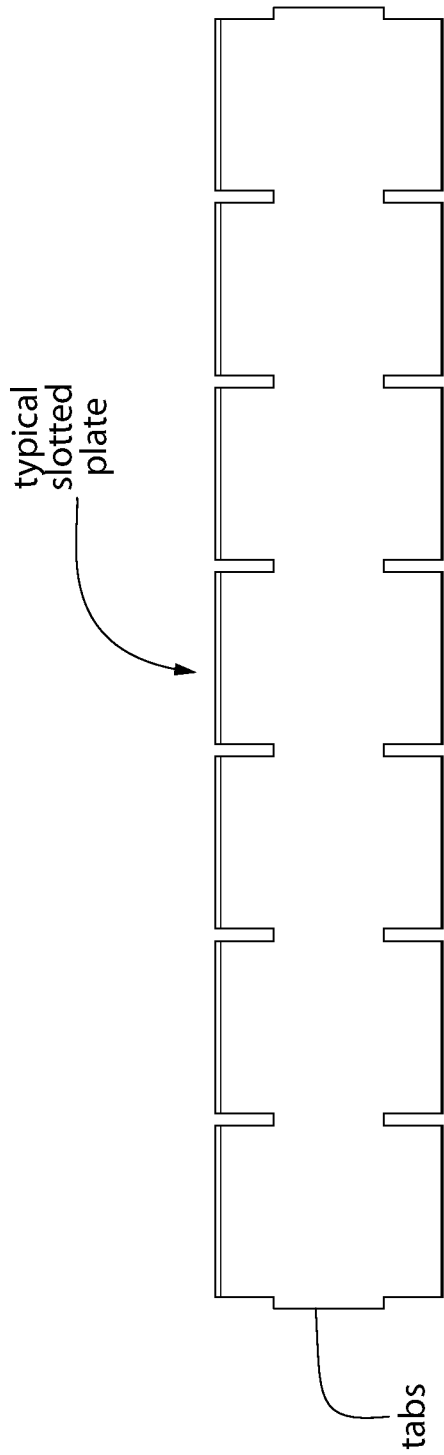
FIG. 2A is a front view of a prior slotted panel or plate design used in the construction of the fuel basket of FIG. 1.
Figure 2B:
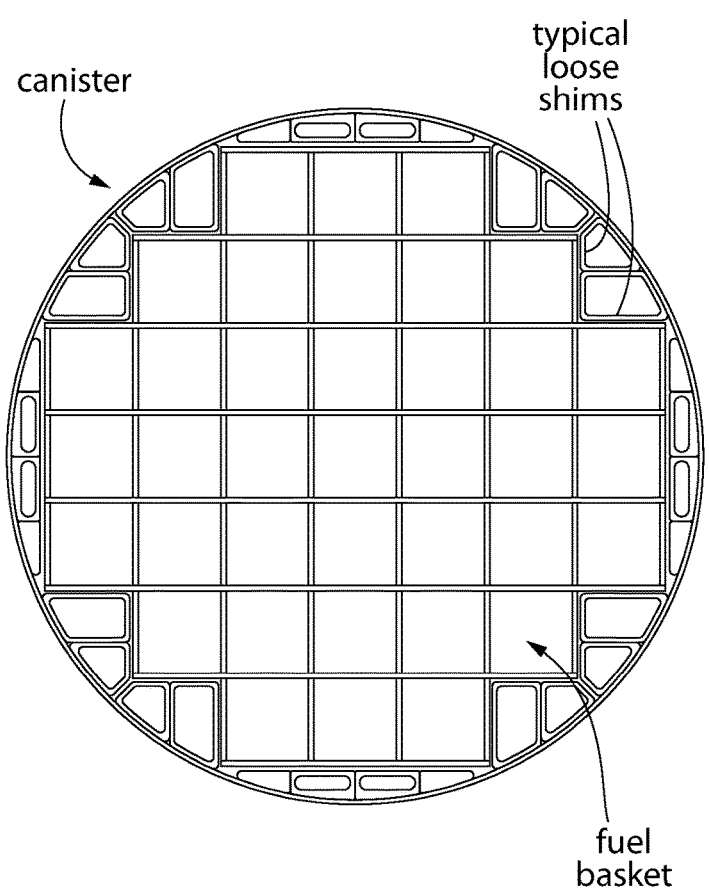
FIG. 2B is a top view of a prior spent nuclear fuel (SNF) canister with fuel basket of FIG. 1 and prior "loose" type shims.
Figure 3:
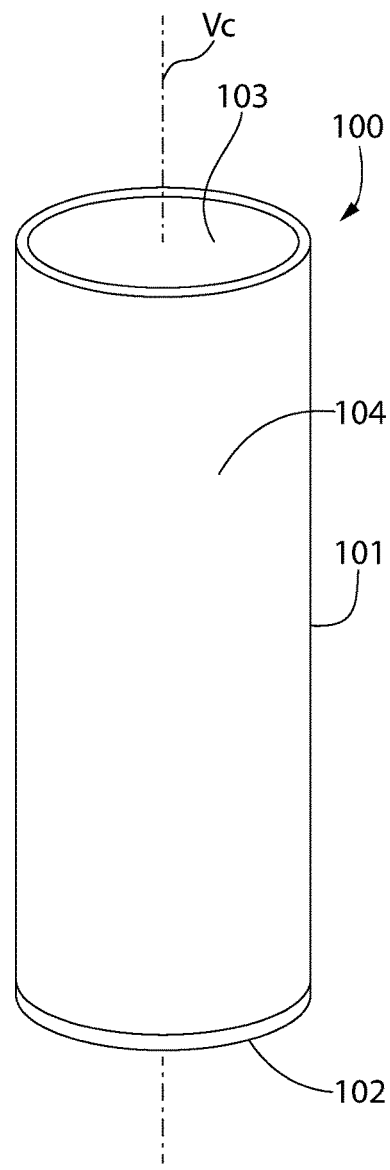
FIG. 3 is a perspective view of an improved SNF canister according to the present disclosure.
Figure 4:
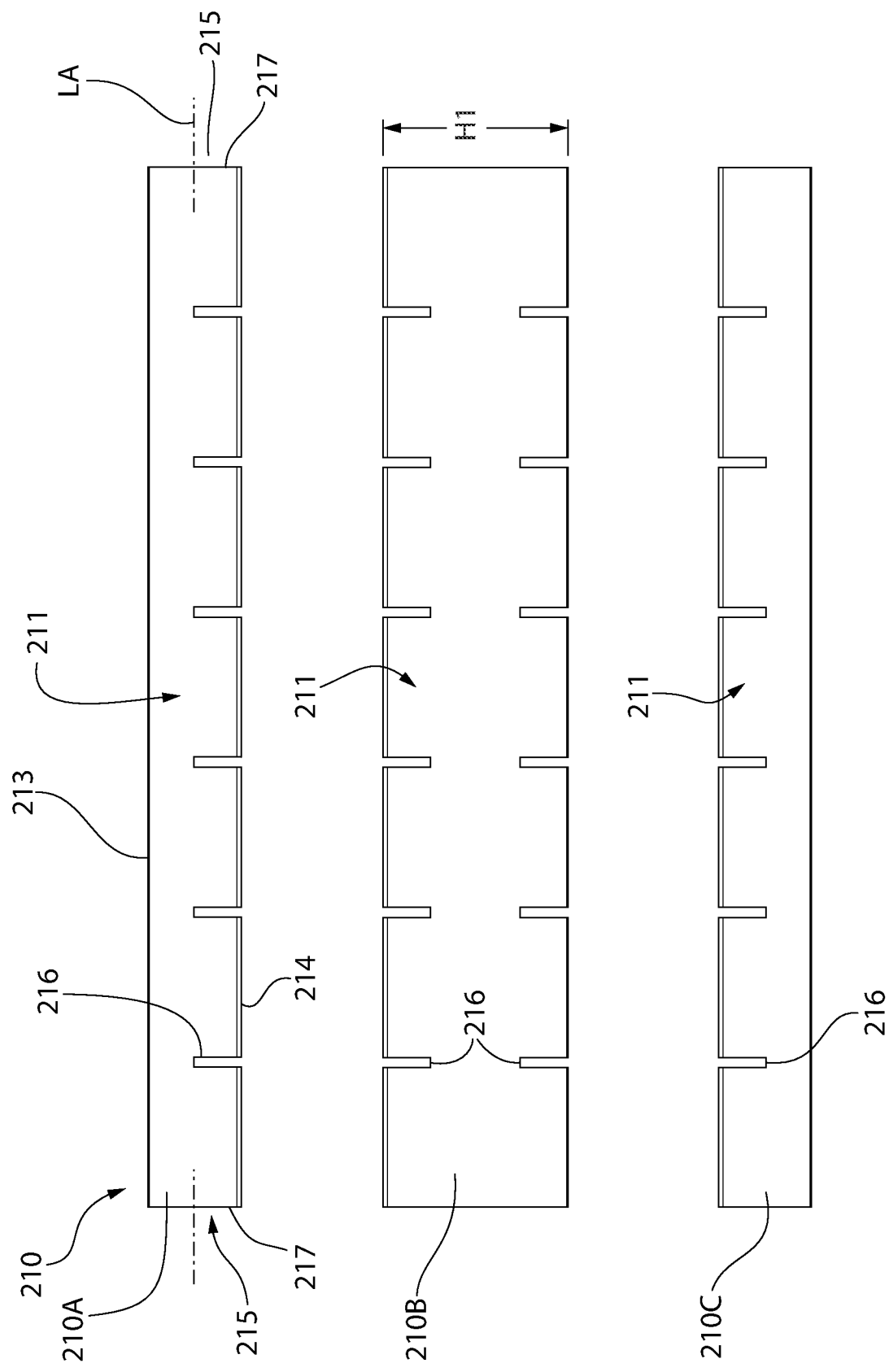
FIG. 4 is a side view of slotted plate designs according to the present disclosure showing examples of a top slotted plate, middle slotted plate, and bottom slotted plate used to construct a fuel basket according to the present disclosure.
Figure 5A:
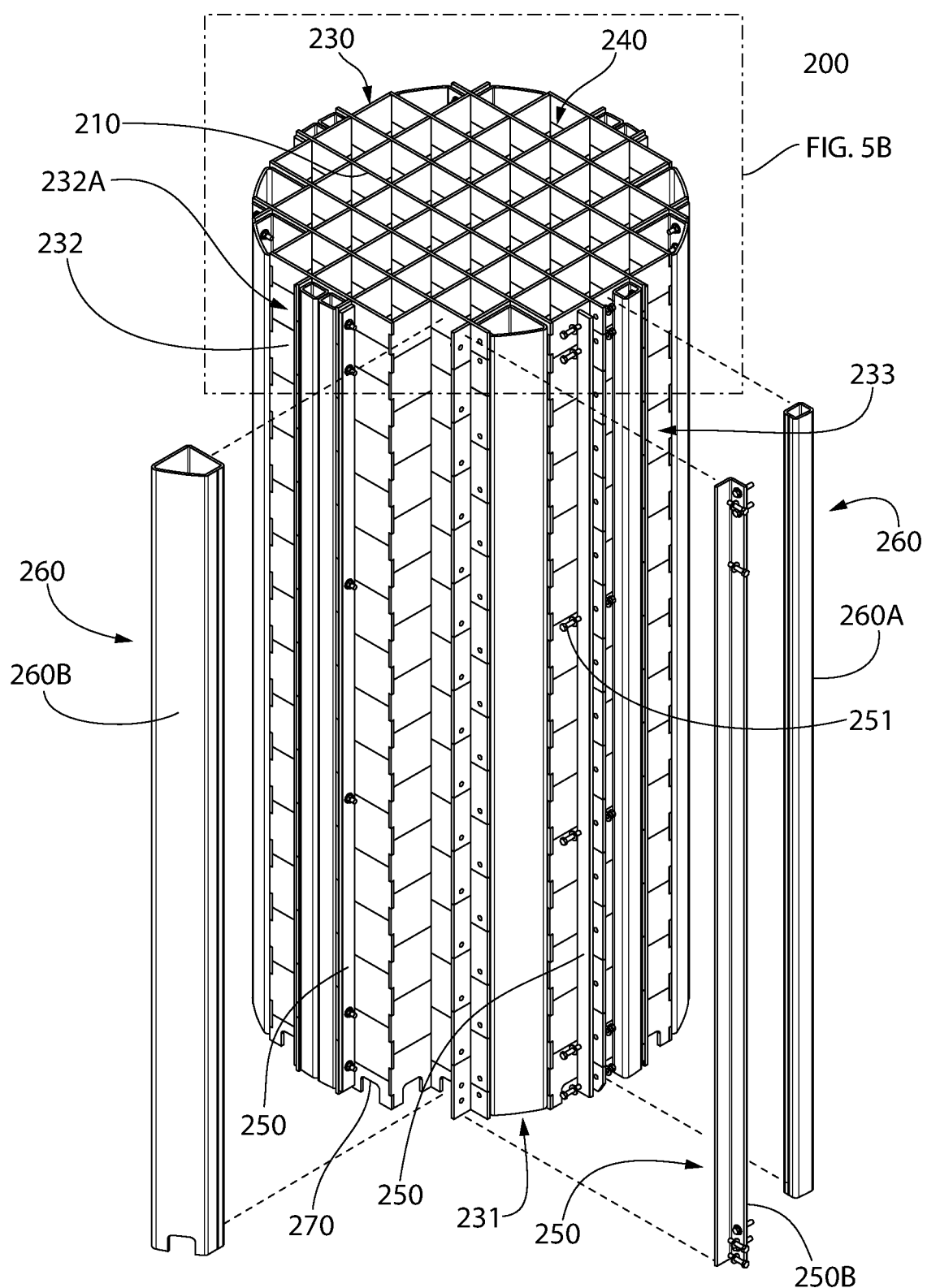
FIG. 5A is a top perspective view of a first embodiment of a fuel basket constructed with the slotted plates of FIG. 4 for use in the fuel canister of FIG. 3, with some fuel basket reinforcement members being drawn out in exploded view.
Figure 5B:
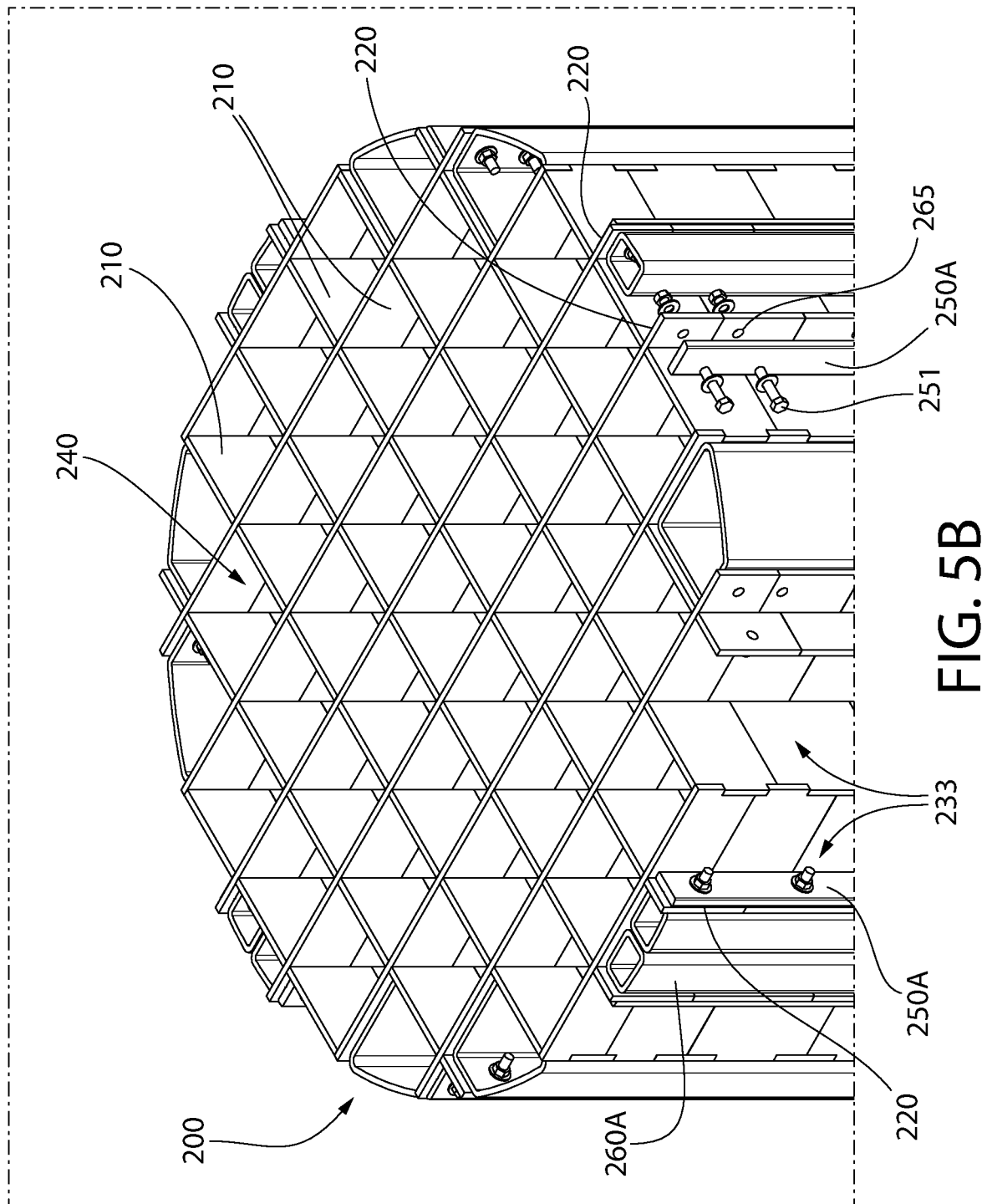
FIG. 5B is an enlarged detail taken from FIG. 5A.
Figure 6:
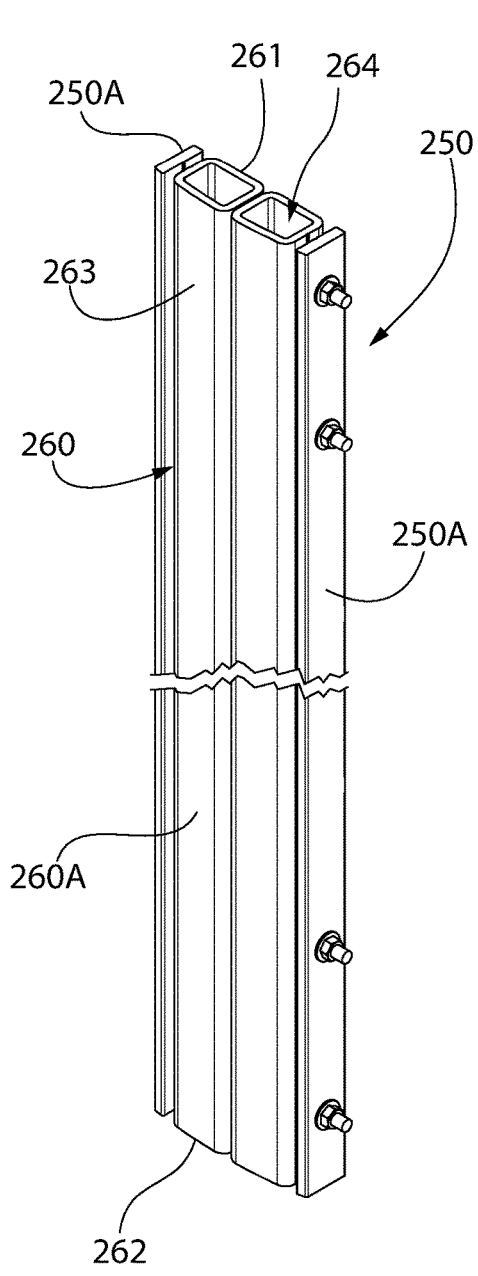
FIG. 6 is a top perspective view showing a first embodiment of a reinforcement member assembly from FIG. 5A.
Figure 7:
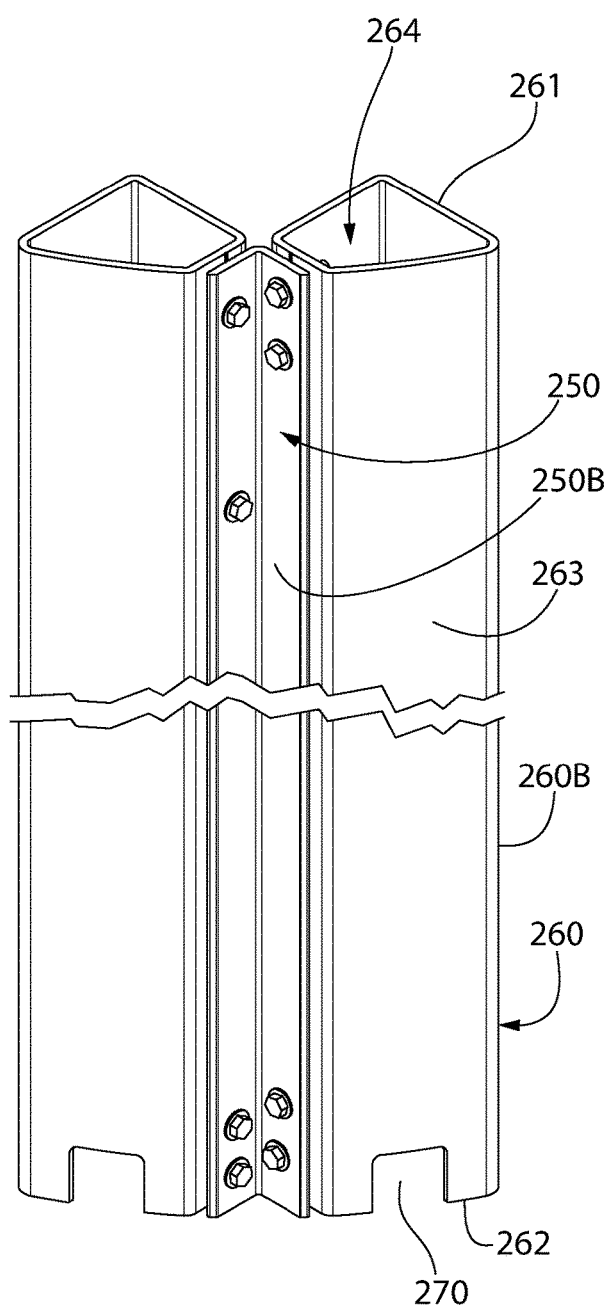
FIG. 7 is a top perspective view showing a second embodiment of a reinforcement member assembly from FIG. 5A.
Figure 8:
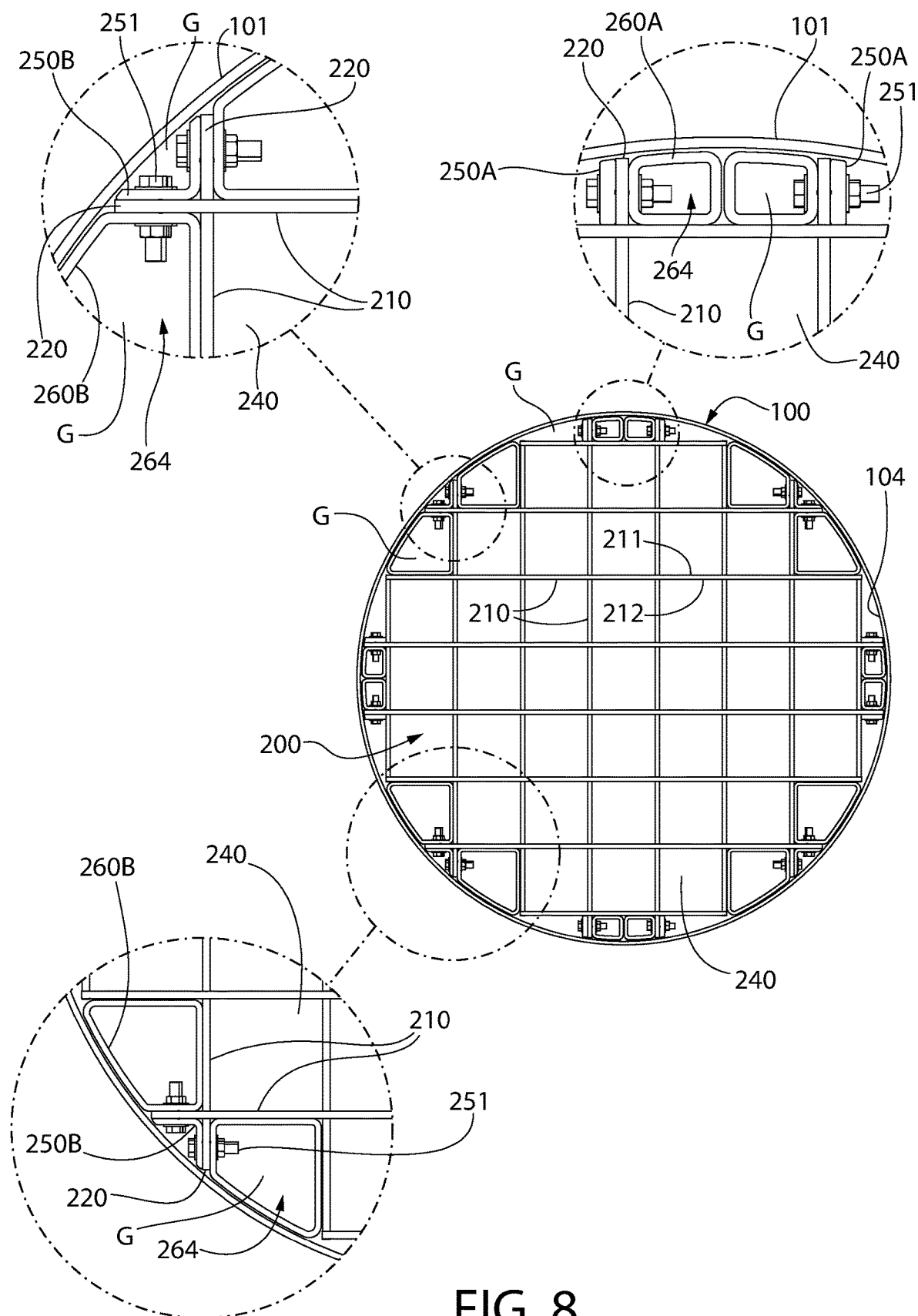
FIG. 8 is a top plan view of the canister and fuel basket of FIG. 5A.
Figure 9A:
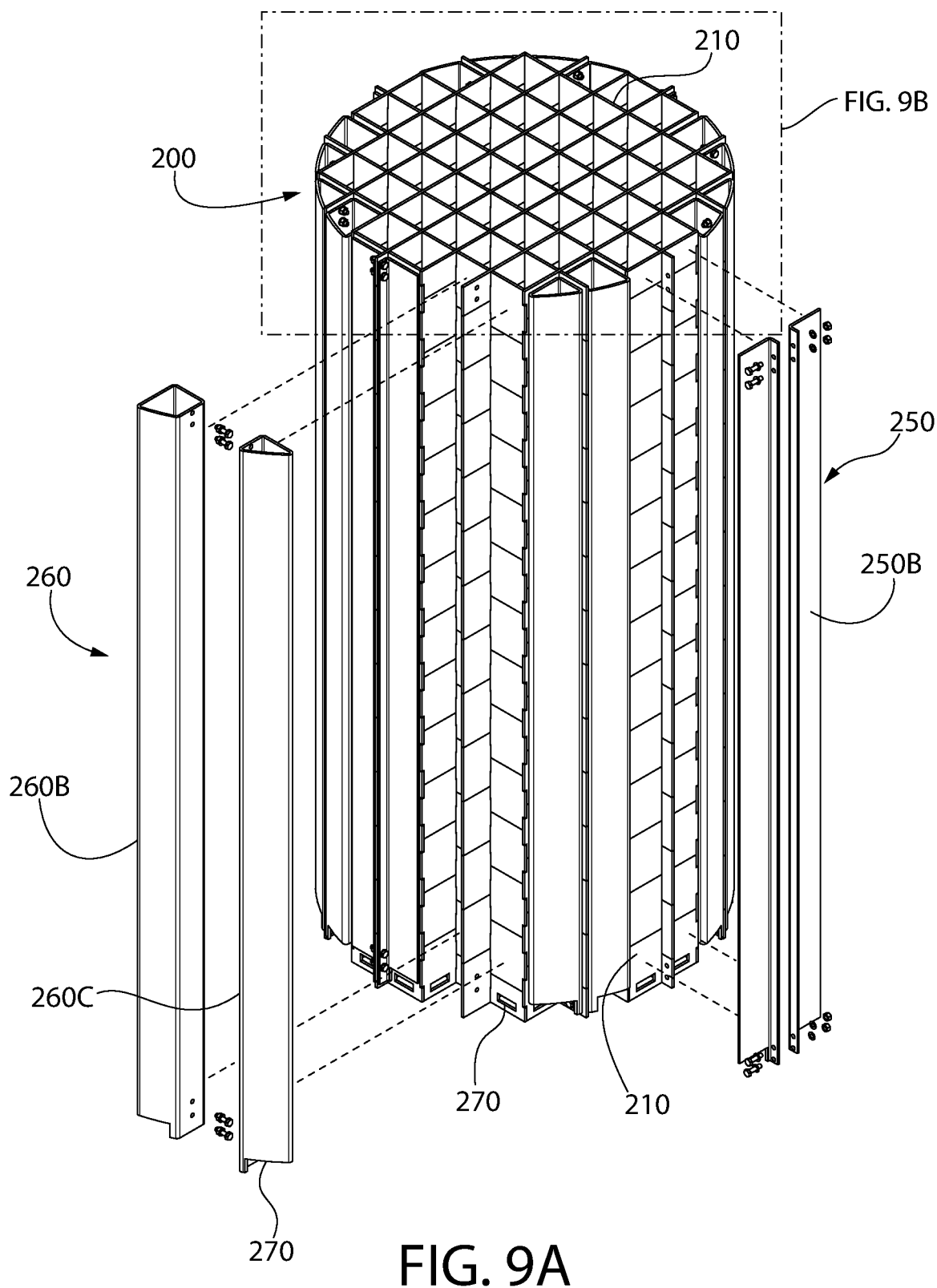
FIG. 9A is a top perspective view of a second embodiment of a fuel basket constructed with the slotted plates of FIG. 4 for use in the fuel canister of FIG. 3, with some fuel basket reinforcement members being drawn out in exploded view.
Figure 9B:
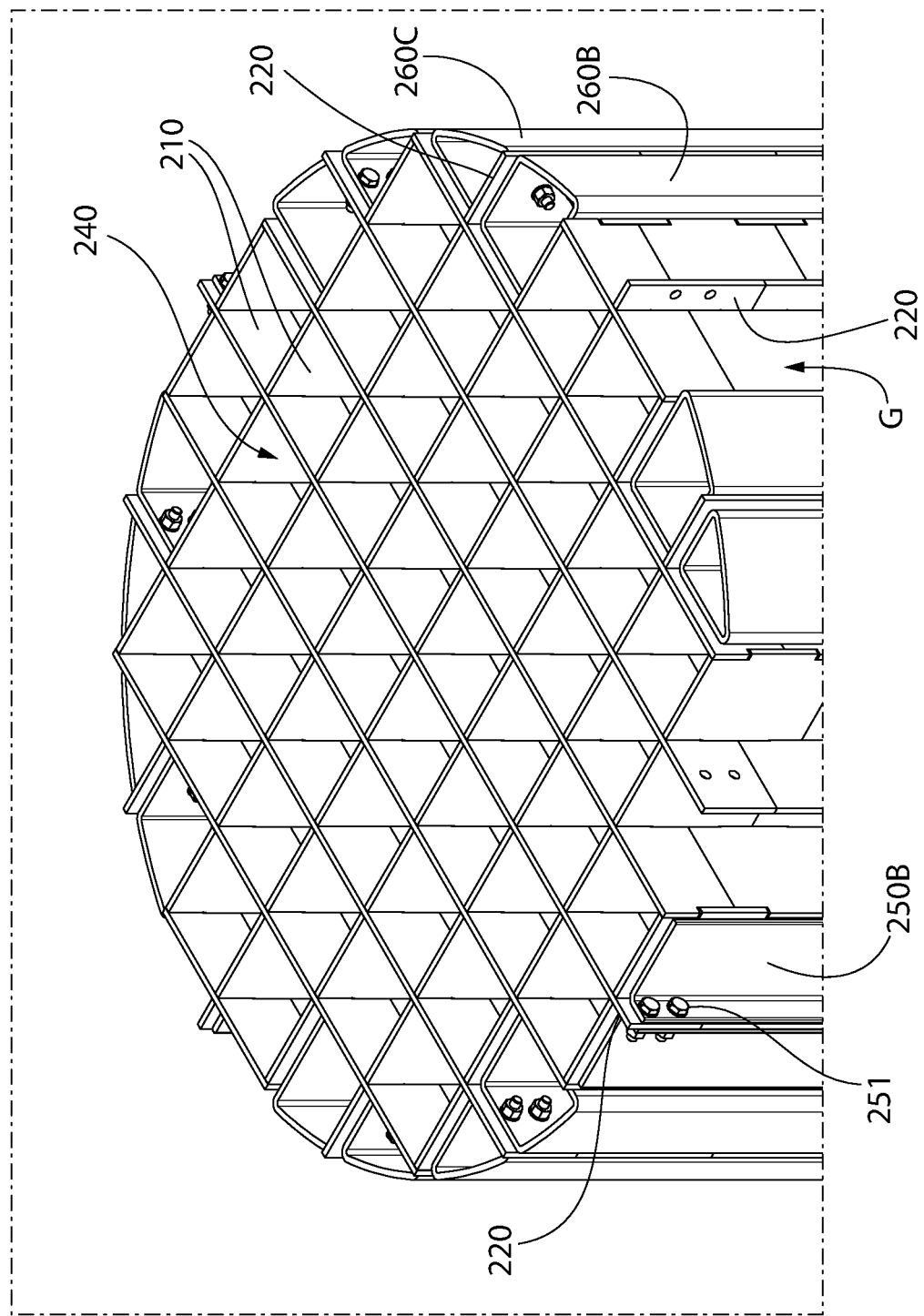
FIG. 9B is an enlarged detail taken from FIG. 9A.
Figure 10:
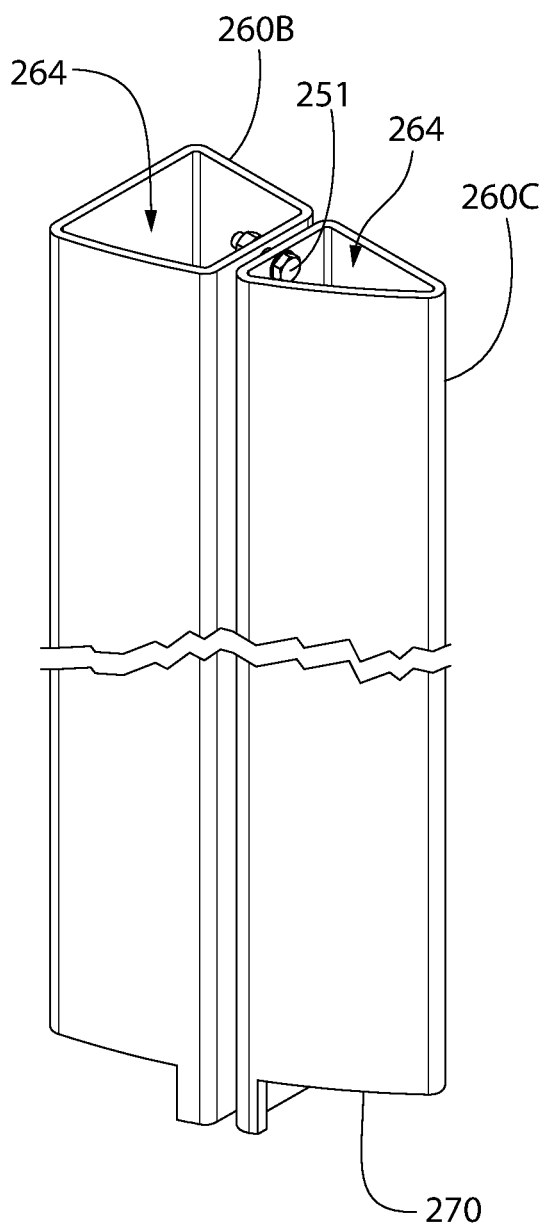
FIG. 10 is a top perspective view showing a third embodiment of a reinforcement member assembly from FIG. 9A.
Figure 11:
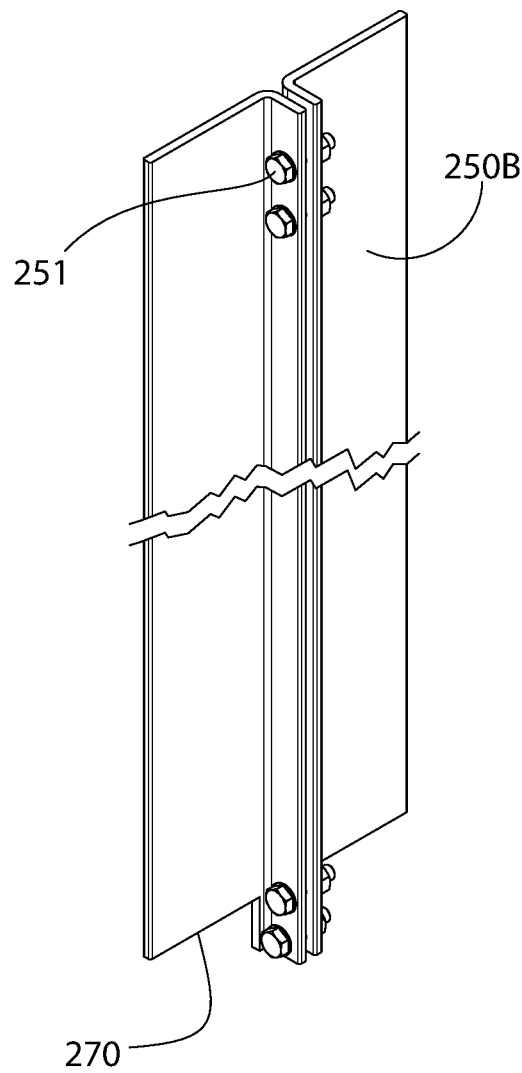
FIG. 11 is a top perspective view showing a fourth embodiment of a reinforcement member assembly from FIG. 9A.
Figure 12:
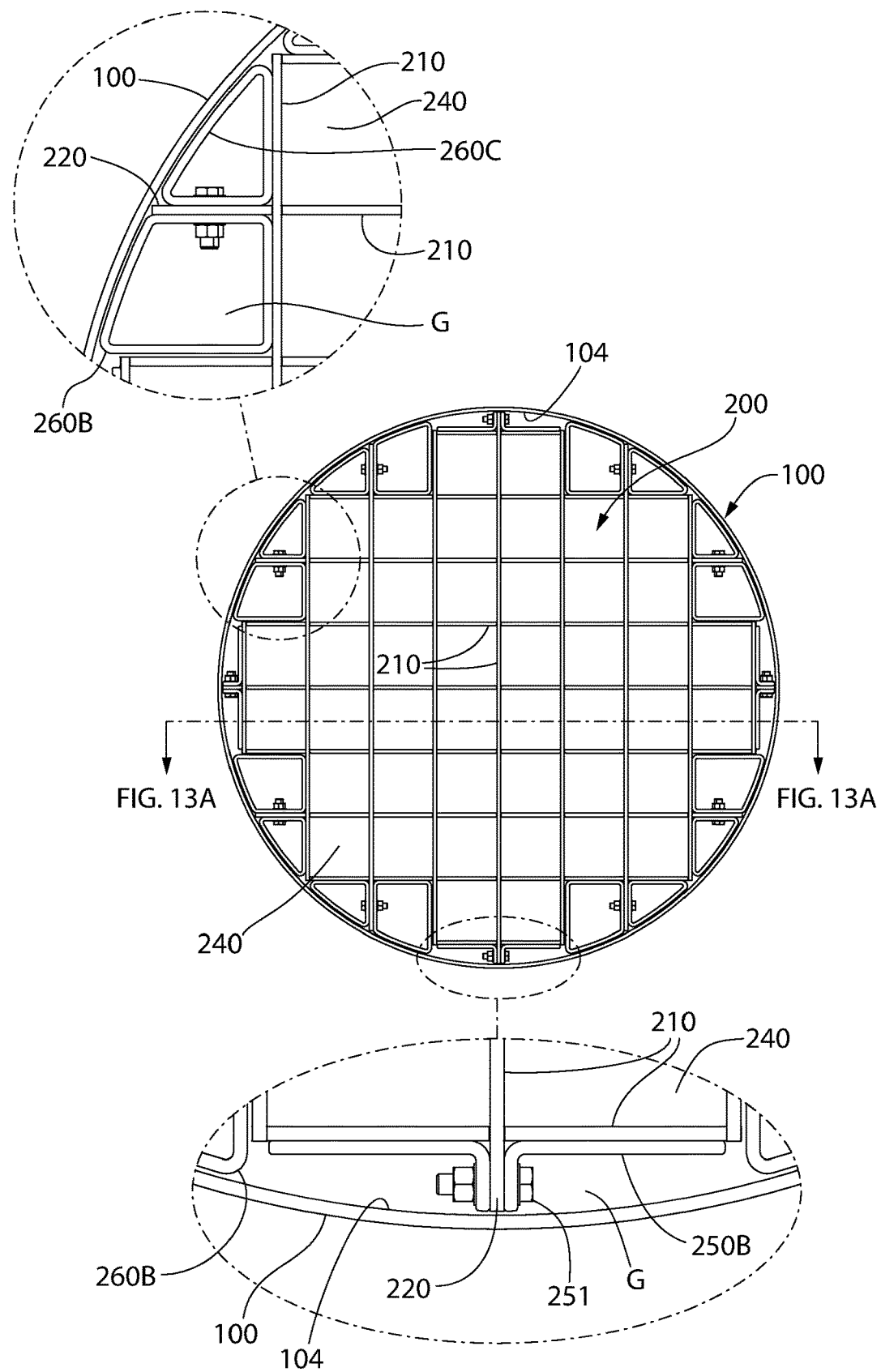
FIG. 12 is a top plan view of the canister and fuel basket of FIG. 9A.

It further bears particular noting that the peripheral side edges 217 defined by the plate extensions 220 of the present slotted plates 210 shown in FIG. 4 each form a straight vertical linear peripheral edge which extends for the full height H1 of the slotted plate 210 from top longitudinal edge 213 to bottom longitudinal edge 214. This contrasts to the undulating edge formed in conventional slotted plate designs which include a tab projection for insertion into a slot-shaped hole of a perpendicularly mating slotted plates (compare FIGS. 2A and 4). In such prior designs shown in FIG. 2A, the tabs do not extend beyond the perpendicularly mating plate as shown in any manner sufficient to form any structural extensions of the plate sufficient to attach and support any other elements in the peripheral gaps between the fuel basket and cylindrical canister shell.

The present slotted plates 210 may have a monolithic body of unitary structure in one embodiment from end to end 215. Plates 210 may be formed of any suitable material. One non-limiting example is a metal, such as preferably a corrosion resistant metal like stainless steel. For enhanced radiation blocking, some or all of the slotted plates may alternatively be formed of suitable radiation shielding materials such as a boron-containing material like Metamic® (a proprietary product of Holtec International of Camden, N.J.). Metamic® is a discontinuously reinforced aluminum boron carbide metal matrix composite material designed for neutron radiation shielding. Other material may be used for plates 210 in certain embodiments.

With continuing reference to FIGS. 3-8, the fuel basket 200 in another aspect further includes a plurality of vertically-extending and elongated reinforcement members or plates 250. Reinforcement plates 250 are positioned in at least some of the peripheral gaps G in the canister 100 between the exterior peripheral side surfaces 233 of the fuel basket 200 and interior surface 110 of the fuel canister 100. The plates 250 are preferably rigidly affixed and coupled to the fuel basket, such as without limitation slotted plate extensions 220 as shown. The reinforcement plates 250 provide structural support and reinforcement of the extensions and fuel basket 200 in both (1) the vertical direction under compression forces in the event the basket were dropped on its end during insertion into the canister 100 (or if the canister were dropped on its end with the fuel basket installed), and (2) the lateral direction. Because the plate extensions 220 are cantilevered without lateral support, they are more susceptible to bending and damage if impacted and not buttressed by the reinforcement plates depending on the unsupported length of the cantilever.

The reinforcement plates 250 may be provided in coordinated pairs of plates of the same or different configurations in some embodiments. At least some of the slotted plate extensions 220, and a majority in certain instances may be fitted with mating pairs of reinforcement plates 250. In certain embodiments, a majority of slotted plate extensions 220 may be coupled to a pair of reinforcement plates 250 (see, e.g. FIGS. 14-18). One reinforcement plate 250 in each pair may be coupled to opposite major side surfaces 211, 212 of the slotted plate 210 on extensions 220 as shown in certain embodiments. These plate extensions 220 may therefore be sandwiched between pairs of reinforcement plates 250 which structurally reinforce the plate extensions from both sides.

In certain embodiments of fuel baskets 200, a single reinforcement plate 250 may be fixedly coupled to one side of some of the plate extensions 220 at certain locations as needed around the peripherally of the basket. Such an arrangement is shown in FIGS. 5-8 further described below.

The reinforcement plates 250 may extend vertically for the full height of the basket 200 from the top 230 to bottom 231 thereby having a coextensive height to the basket. Plates 250 may be formed of any suitable metal, such as preferably a corrosion resistant metal such as for example without limitation aluminum or stainless steel. Other metals may be used.

Reinforcement plates 250 may have a variety of polygonal transverse cross-sectional shapes (e.g. rectilinear) as needed to match the configuration of the peripheral spaces or gaps G between the fuel basket 200 and cylindrical canister shell 101 where they plates are to be installed. The plates 250 may have typical structural shapes used in industry and are laterally open structures which do not define an interior space (unlike the tubular shimming members 260 further described herein). Non-limiting examples of some rectilinear shapes which may be used for reinforcement plates 250 include for example without limitation straight reinforcement plates 250A having a flat strap-like body and L-shaped angled reinforcement plates 250B having an angled body similar to a structural angle (see, e.g. FIG. 8). The angled reinforcement plates 250B may have perpendicularly oriented legs of equal or unequal width as needed to match the cross-sectional shape and geometry of the peripheral G in which the plates are to be positioned. Other polygonal shapes, non-polygonal shapes, or combinations thereof may be used for reinforcement plates 250 as needed to match the shape of the mating associated peripheral gap G in which the plates are to be positioned.

Single or pairs of reinforcement plates 250 may be fixedly coupled to the lateral plate extensions 220 of slotted plates 210 via any suitable coupling mechanism. In one embodiment, reinforcement plates 250 may be bolted to the slotted plate extensions via bolts 251 which comprise assemblies of the elongated threaded bolt body, nuts, and washers as shown. The nuts may be tack welded to the bolt bodies after assembly to the fuel basket plate extensions 220 to prevent their loosening. The bolt bodies are received through bolt holes 265 formed in the plate extensions 220 and reinforcement plates 250 at the bolting locations. The reinforcement plates 250 are bolted to at least the plate extensions 220 of the uppermost and lowermost slotted plates 210 in the fuel basket assembly. Multiple bolts may be used at these upper and lower locations to fixedly couple the reinforcement plate 250 to the slotted plate extensions 220 as shown. Preferably, the reinforcement plates may be further bolted to some intermediate plate extensions 220 therebetween along the height of the fuel basket 220 in a vertically spaced apart manner for added securement of the extensions to the fuel basket 200 (see, e.g. FIG. 5A). The bolting may be completed to rigidly affix the reinforcement plates 250 to the fuel basket 200 before the basket 200 is slideably inserted into the cavity 104 of the fuel canister 100.

It will be appreciated that the reinforcement plates 250 are only positioned within the peripheral pockets or gaps G outboard of the peripheral sides 232 of the fuel basket 200 around its perimeter, and not the interior. Because the bolting preferably does not protrude into any of the fuel assembly storage cells 240 of the basket 200, the bolts 251 do not interfere with sliding and loading the spent fuel assemblies 28 into the cells.

Reinforcement plates 250 may be formed of a suitable metal such as high temperature tolerant materials like Aluminum Alloy 2219 or other, corrosion resistant steel such as stainless steel, or other metal which may be extruded or otherwise formed to shape.

With continuing reference to FIGS. 3-8, the hybrid shimming system of fuel basket 200 further includes reinforcement members in the form of tubular shim members 260 fixedly coupled to the basket (e.g. plate extensions 220). Shim members 260 may occupy peripheral gaps G which do not contain reinforcement plates 250 in some embodiments. This provides several advantages. For example, the tubular shim members may be positioned into larger peripheral gaps G around the perimeter of the fuel basket to add greater structural stability and reinforcement of the basket in those locations. The smaller peripheral gaps may be structurally reinforced by use of the reinforcement plates 250 in those locations which can be fabricated and are shaped to fit such tighter spaces more readily. By integrating the tubular shim members 260 into the basket structure by rigid fixation thereto, a greater resistance of the fuel basket to compressive forces acting on the ends of the shim members and basket is achieved since the shim tubes act as columns which structurally can withstand greater compressive forces if the canister (or fuel basket alone before insertion therein) were dropped during handling than the reinforcement plates 250 alone. The tubular shim members 260 also offer greater resistance to laterally directed forces on the fuel basket and canister in the event of a drop at least partially on the side of the basket or canister after basket insertion therein. This advantageously offers better protection for the fuel assemblies in the basket from physical damage during a drop event. In addition, fabrication costs can be reduced for the fuel basket 200 since the number of tubular shim members 260 can be minimized when combined with the reinforcement plates 250 which generally have simpler rectilinear shapes (in cross section) as shown that are less costly to fabricate.

The tubular shim members 260 each comprise vertically elongated bodies defining a top end 261, bottom end 262, and sidewalls 263 extending therebetween which defines an enclosed central opening 264. Top and bottom ends 261, 262 may be open to the central opening 264. Tubular shim members 260 may have a height coextensive with the height of the fuel basket, and further with the height of the reinforcement plates 250. Both the tubular shim members 260 and reinforcement plates 250 are oriented parallel to the vertical centerline Cv of the canister 100.

Tubular shim members 260 may have a variety of transverse cross-sectional shapes as need to complement the geometry of the peripheral gaps G in which they are positioned. Shim members 260 may therefore have a polygonal cross-sectional shape (e.g. rectangular, square, triangular, hexagonal, etc.), non-polygonal cross-sectional shape (e.g. circular, etc.), or combinations thereof. In the illustrated embodiment, a combination of rectilinear tubular shim member 260A comprised of four substantially straight rectangular walls, and partial square shim members 260B comprised of three perpendicularly oriented inner straight walls, and an outer arcuately curved wall extending therebetween are provided. Other shapes may be used depending on the cross-sectional shape of the peripheral gap G. For example, the embodiment of FIGS. 9-12 further described herein show tubular shim members 260C having a partial triangular cross-sectional shape comprising two perpendicularly oriented inner walls and an outer arcuately curved wall extending therebetween which matches the curve of the canister 100 interior surface.

Similarly to reinforcement plates 250, tubular shim members 260 may be fixedly coupled to the slotted plate extensions 220 of fuel basket 200 in the same manner such as in one embodiment via bolts 251 previously described herein which comprise assemblies of the threaded bolt body, nuts, and washers. The shim members 260 are bolted to at least the plate extensions 220 of the uppermost and lowermost slotted plates 210 in the fuel basket assembly. The vertical central space 264 and open top and bottom ends 261, 262 of the tubes provide access to the bolting necessary to tighten the fastener assemblies. Accordingly, part of the bolts 251 protrudes into the central spaces of the tubes as shown. Multiple bolts may be used at these upper and lower locations to fixedly couple the reinforcement plate 250 to the slotted plate extensions 220.

In some embodiments as shown, the same bolts 251 may be used to fixedly couple both a reinforcement plate 250 and a tubular shim member 260 to a single slotted plate extension 220. The plate extension may therefore be sandwiched in an assemblage between the reinforcement plate and shim tube (best shown in FIG. 8). In some instances, a pair of tubular shim members 260 may occupy the same peripheral pocket or gap G (see, e.g. FIG. 8, top right detail image).

In other less preferred but still satisfactory embodiments, the tubular shim members 260 and/or reinforcement plates 250 may be welded to the slotted plate extensions 220. Bolting shim members 260 and reinforcement plates 250 to the fuel basket plate extensions 220 obviates any issues with forming dissimilar metal welds and offers fabrication savings since bolting is generally a less expensive coupling procedure than welding.

Tubular shim members 260 may be formed of a suitable metal such as high temperature tolerant materials like Aluminum Alloy 2219 or other, corrosion resistant steel such as stainless steel, or other metal which may be extruded or otherwise formed to shape.

Figure 13B:
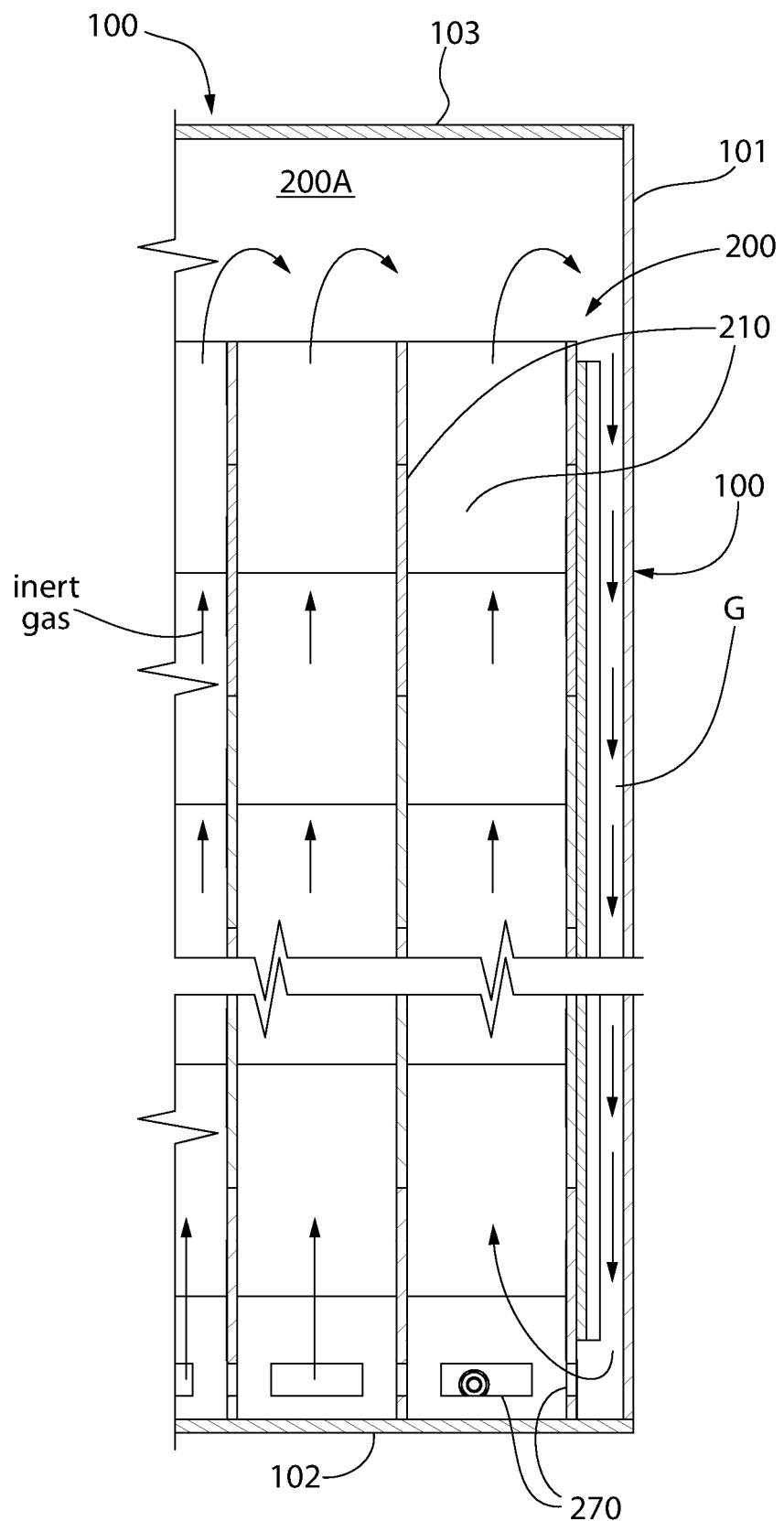
FIG. 13B is a partial vertical cross sectional view of the canister and fuel basket of FIG. 13A showing portions of an inert gas recirculation circuit and directional flow arrows thereof.
Figure 14A:
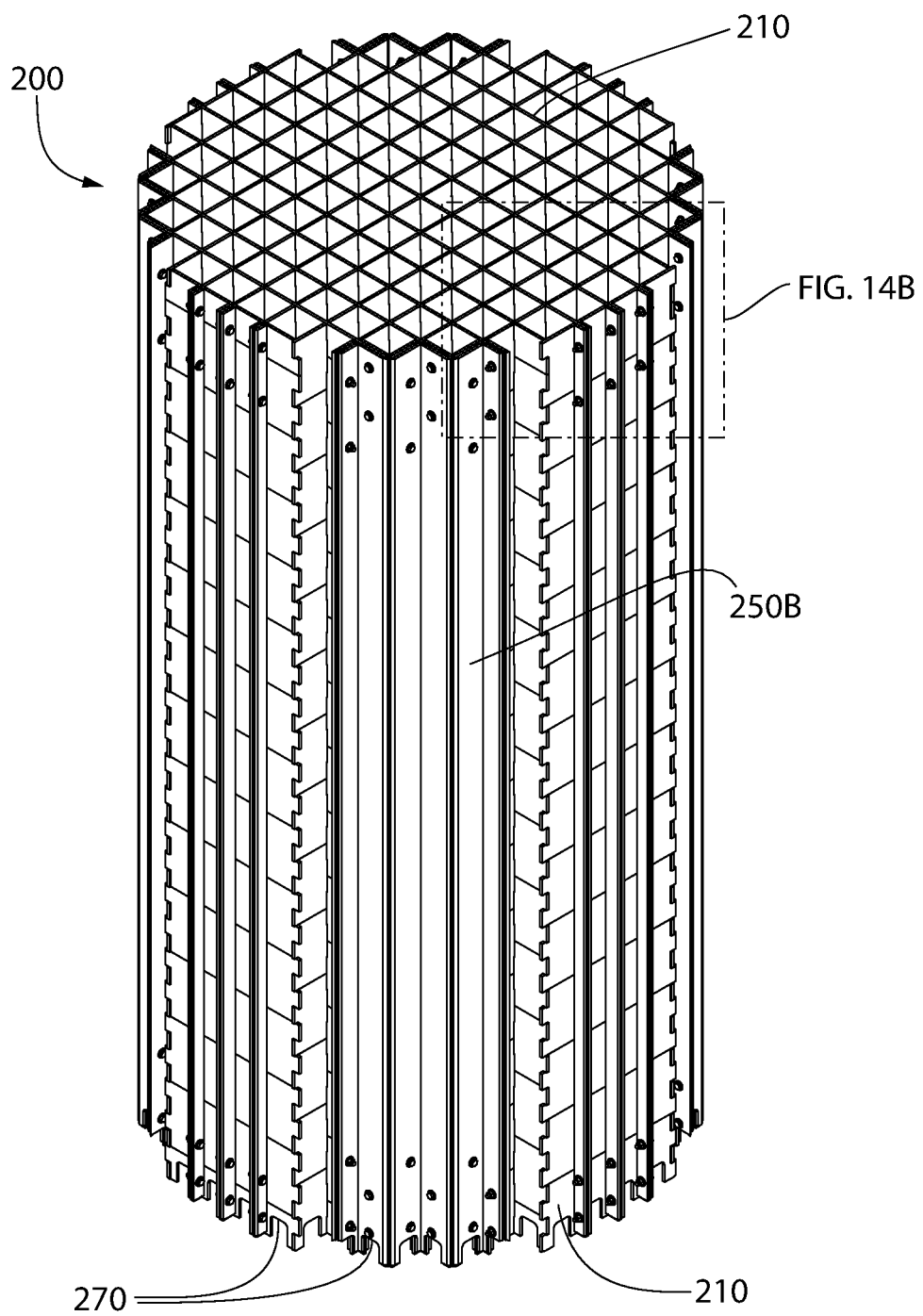
FIG. 14A is a top perspective view of a third embodiment of a fuel basket constructed with the slotted plates of FIG. 4 for use in the fuel canister of FIG. 3.
Figure 14B:
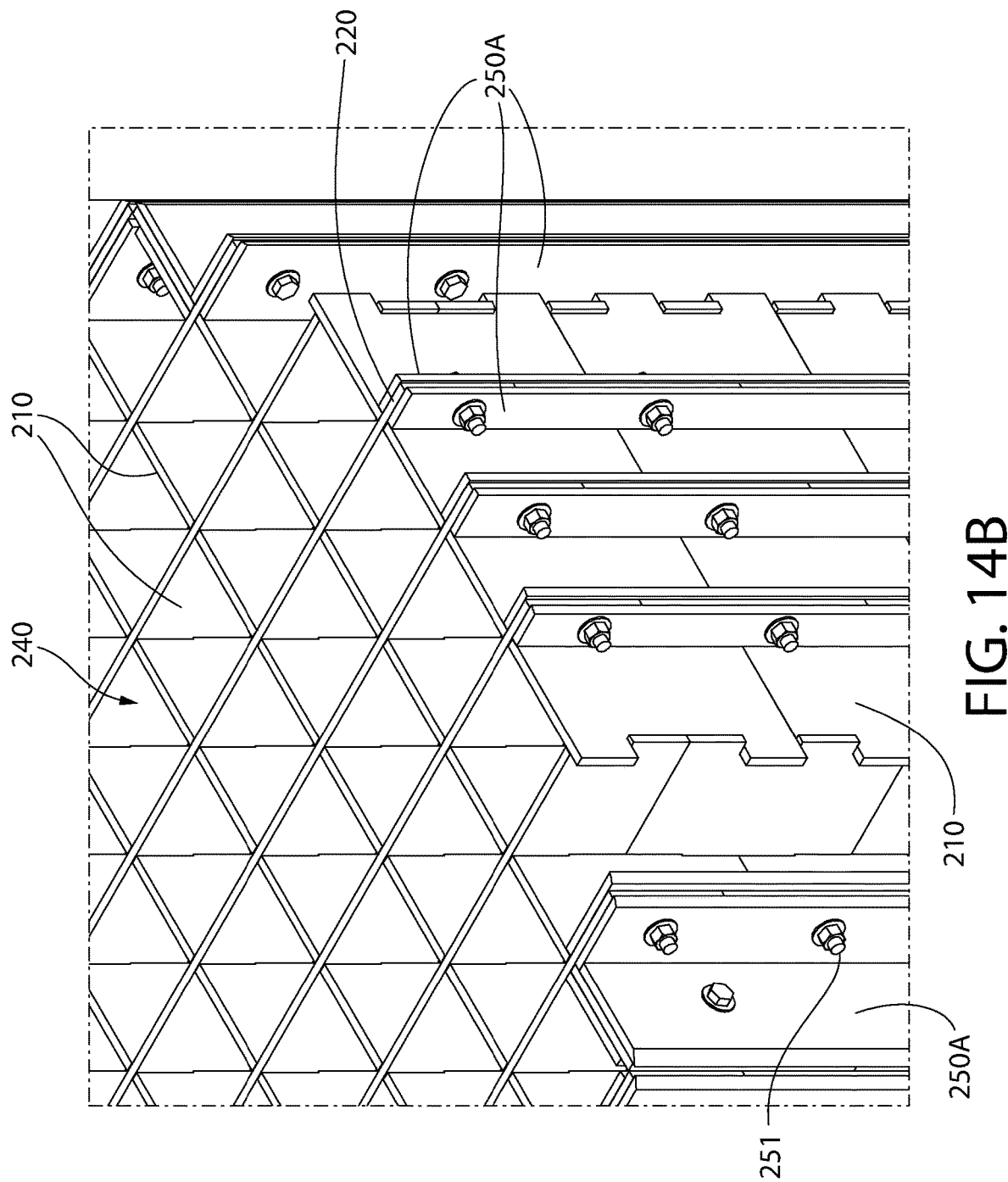
FIG. 14B is an enlarged detail taken from FIG. 14A.
Figure 15A:
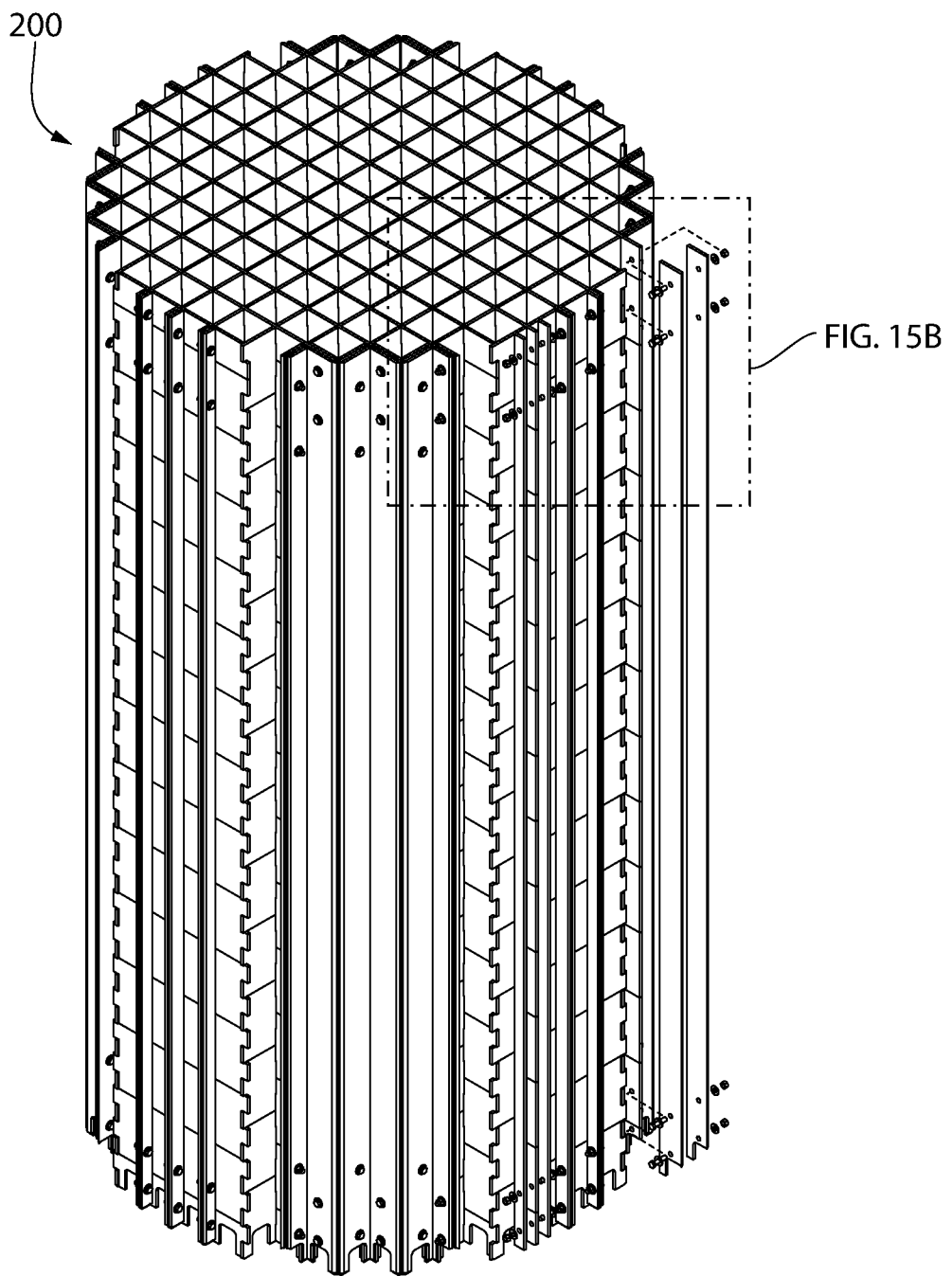
FIG. 15A is a top perspective view of the fuel basket of FIG. 14A showing some fuel basket reinforcement members being drawn out in exploded view.
Figure 15B:
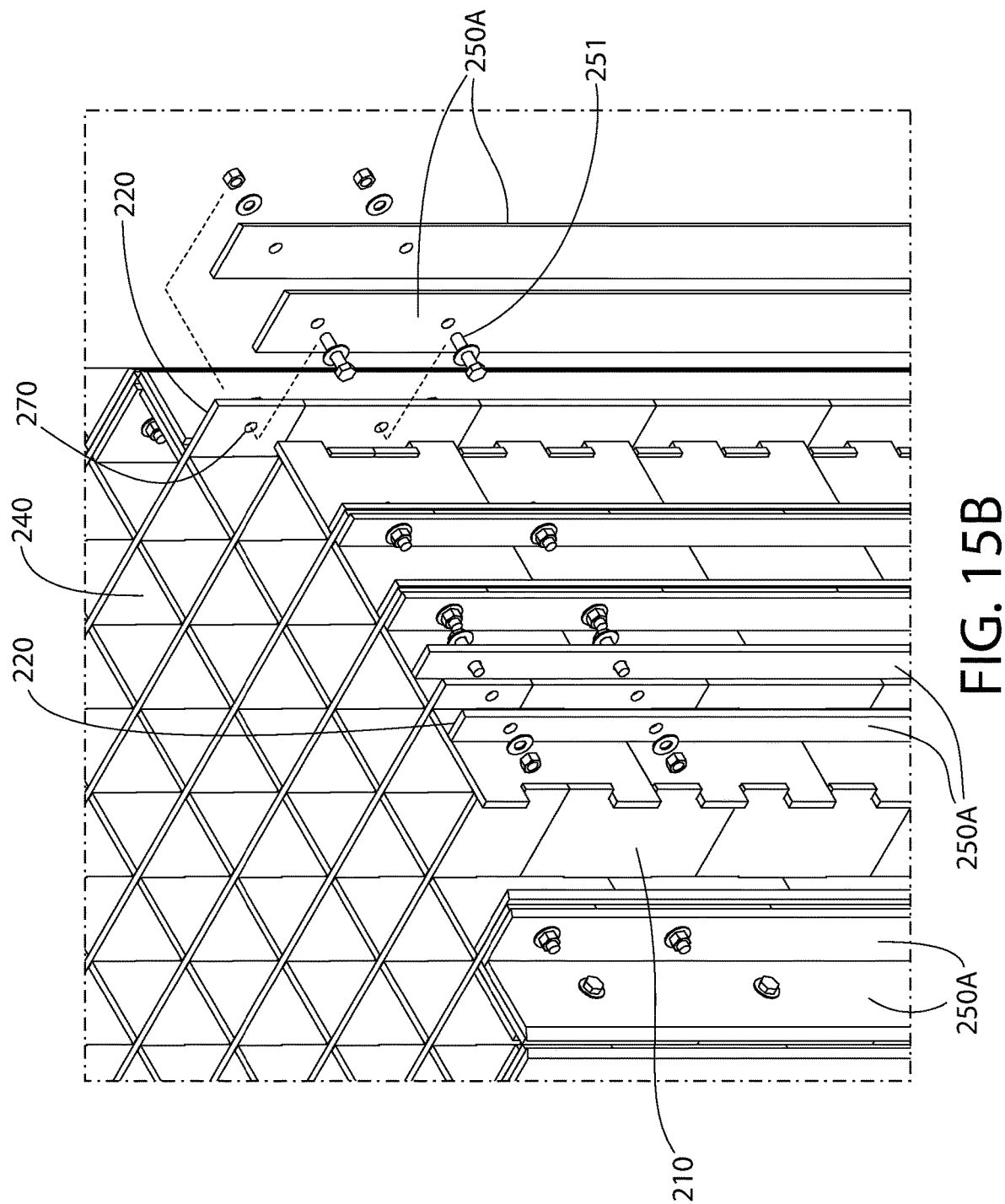
FIG. 15B is an enlarged detail taken from FIG. 15A.
Figures 16, 17:
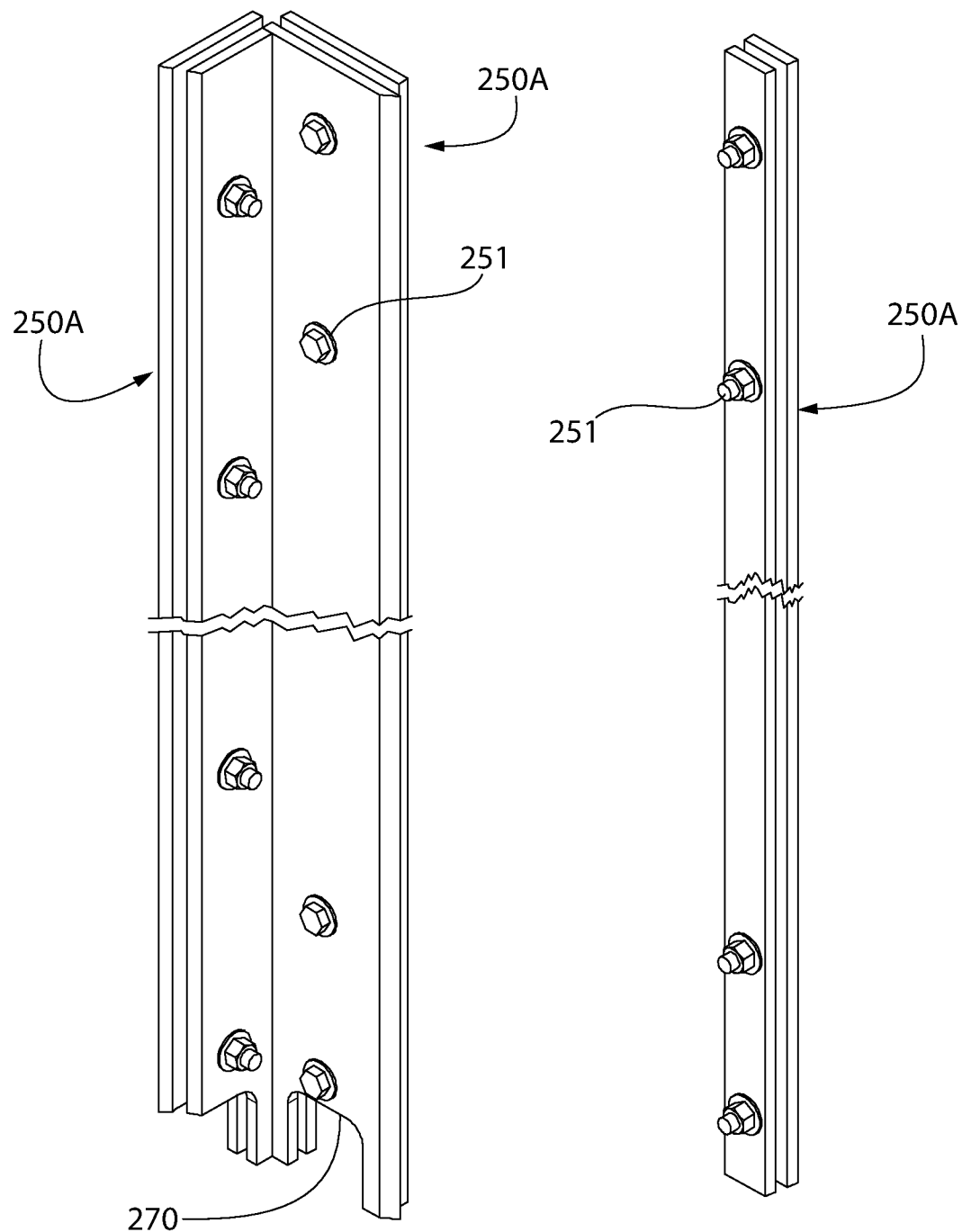
FIG. 16 is a top perspective view showing a fifth embodiment of a reinforcement member assembly from FIG. 14A.
FIG. 17 is a top perspective view showing a sixth embodiment of a reinforcement member assembly from FIG. 14A.
Figure 18:
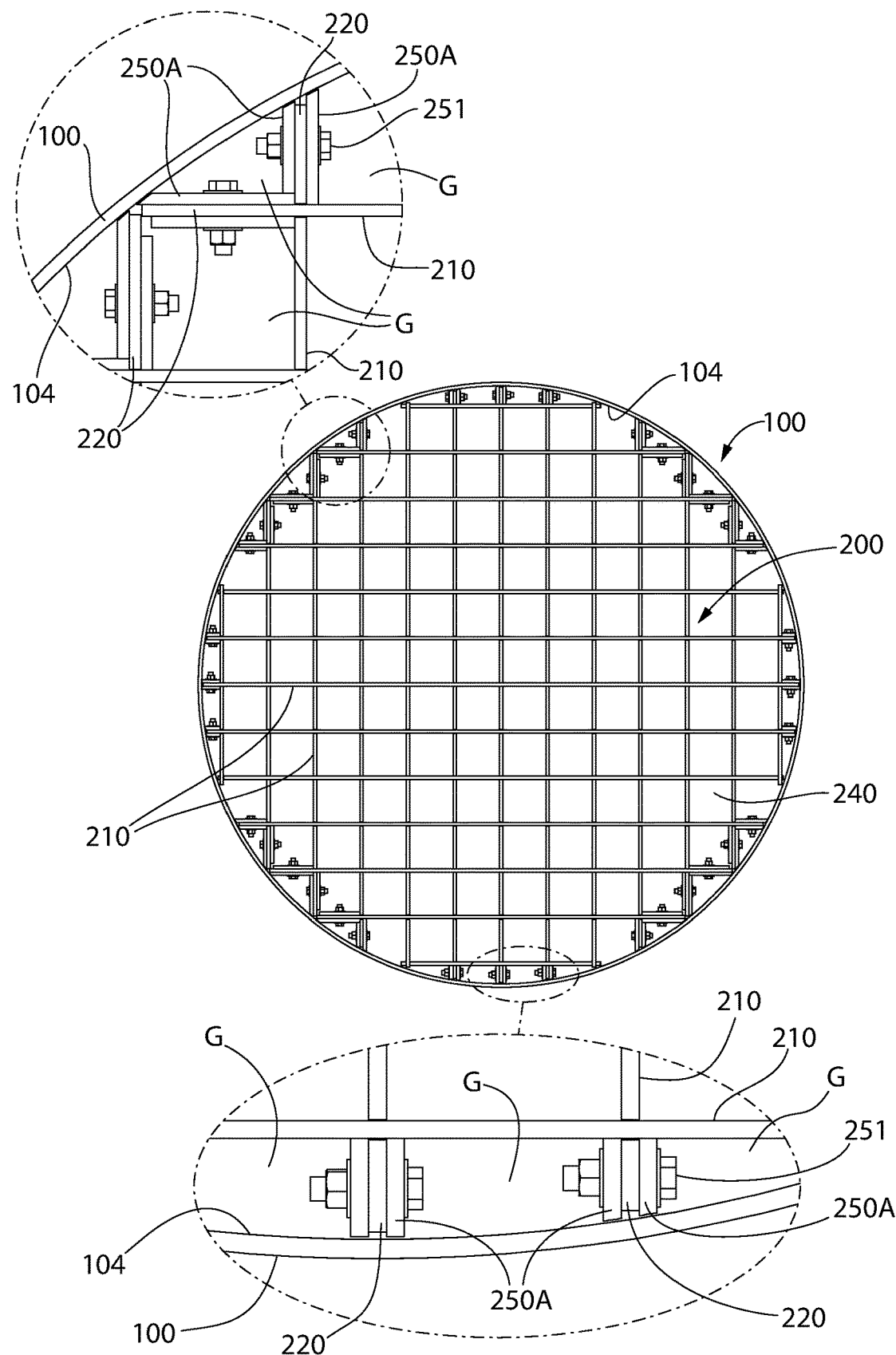
FIG. 18 is a top perspective view showing a second embodiment of a reinforcement member assembly from FIG. 5A.

With continuing reference to FIGS. 4-8, the bottom edges of some or all of the lateral plate extensions 220, reinforcement plates 250, and/or tubular shim members 260 may further comprise flow holes or cutouts 270 where the edges abuttingly engage the bottom closure plate 102 of the canister 100. This provides flow access to the fuel assembly storage cells 240 in the basket 200 which allows the inert gas (e.g. helium or other inert gas) circulating and contained in cavity 104 of the canister to blanket the fuel assembles for corrosion protection. The flow cutouts 270 allow the gas to recirculate up and down within the canister via natural convective thermosiphon action driven by the heat emitted from the decaying fuel assemblies 28. The peripheral spaces or gaps G between the fuel basket and cylindrical shell 101 of the canister 100 act as a gas flow downcomer of the gas recirculation circuit which is in fluid communication via cutouts 270 with the interior space formed by the cells 240 inside the fuel basket which contain the fuel assemblies. The upper flow plenum 200A formed in the canister above the top of the fuel basket 200 is in fluid communication with both the peripheral downcomer and interior riser. This is best shown in FIG. 13B which depicts inert gas flow arrows showing the gas flow recirculation circuit used to cool the fuel assembly.

FIGS. 9-13B depict a nuclear fuel canister 100 with fuel basket 200 comprising a second embodiment of a hybrid integral shimming system according to the present disclosure which structurally reinforces and centers/stabilizes the fuel basket 200 in the canister. This embodiment is similar to the first embodiment shown in FIGS. 3-8 in that it combines reinforcement members comprising both reinforcement plates 250 and tubular shim members 260; albeit some of slightly different configuration. These reinforcement members are fixedly bolted to the fuel basket cantilevered lateral plate extensions 220 and have a vertical height coextensive with the full height of the fuel basket. These reinforcement members may include flow cutouts 270 (also formed in the slotted plate extensions 220 as previously described herein. All similar features of the canister, fuel basket, and shimming system will therefore not be repeated here in detail for the sake of brevity. Differences will be described with a general overview of the second embodiment as well.

Although the present embodiment (and the prior embodiment in FIGS. 5-8) uses a combination of reinforcement members comprised of both reinforcement plates 250 and tubular shim members 260, it bears noting that in other embodiments only reinforcement plates or only tubular shim members may be used depending on the configuration/geometry and sizes of the peripheral gaps G formed between the canister shell 101 and exterior sidewalls 232A of the fuel basket.

Referring to FIGS. 9-13B, fuel basket 200 comprises more interior fuel assembly storage cells 240 (e.g. 44 cells as shown) than the number of cells in the embodiment of the fuel basket of FIGS. 3-8 (e.g. 37 cells as shown). The diameter of the canister 100 however may be same in both embodiments in certain instances. The 37 cell fuel basket represents the largest capacity previously available on the market, which is limited at least in part by the lower heat rejection capacity of prior basket designs which dissipates heat emitted by the decaying nuclear fuel assembly. Accordingly, the greater heat rejection capability of the present fuel basket designs using the integral shimming system advantageously allows for a greater number of fuel assemblies to be safely stored in the canister without increasing the diameter.

The reinforcement members in the present embodiment of FIGS. 9-13B include perpendicularly angled reinforcement plates 250B previously described herein. In this embodiment of the fuel basket shimming system, angled plates 250B have legs of unequal length to fit the peripheral gap G in which they are located. The tubular shim members include the four sided shim members 260B and generally triangular shaped shim members 260C previously referred to. In this embodiment, shim members 260B and 260C are fixedly coupled together via bolts 251 which pass laterally/horizontal therethrough and through lateral plate extensions 220 of the fuel basket which is sandwiched between the shim members and extension as shown. The shim members 260B and 260C occupy different peripheral gaps G on each side of the plate extension.

FIGS. 14-18 depict a nuclear fuel canister 100 with fuel basket 200 comprising a third embodiment of a hybrid integral shimming system according to the present disclosure which structurally reinforces and centers/stabilizes the fuel basket 200 in the canister. Fuel basket 200 in this embodiment comprises more interior fuel assembly storage cells 240 (e.g. 104 cells as shown) than the number of cells in either the fuel baskets of FIG. 3-8 or 9-13B. The canister diameter however may be the same as in these prior embodiments described.

The increased number of storage cells 240 results in peripheral gaps G generally too small to practically accommodate tubular shimming members 260 having larger transverse cross-sectional profile. This embodiment includes reinforcement members comprising only reinforcement plates 250A of the straight and flat strap-shaped design previously described herein. In some peripheral gaps G, a pair of perpendicularly oriented reinforcement plates 250A may be positioned in a single gap and fixedly coupled to different orthogonally oriented plate extensions 220 as shown to collectively form an L-shaped angled support. These 2-piece assemblies of reinforcement plates 250A may be replaced in some embodiments by a single monolithic angled reinforcement plate 250B previously described herein. The reinforcement plates are fixedly bolted to the fuel basket cantilevered lateral plate extensions 220 by bolts 251 and have a vertical height coextensive with the full height of the fuel basket. These reinforcement members may also include flow cutouts 270 as needed (also formed in the slotted plate extensions 220 as previously described herein).

All other similar features of the canister, fuel basket, and present shimming system as the prior shimming system embodiments described will therefore again not be repeated here in detail for the sake of brevity.

A method for forming a structurally reinforced fuel basket for storing nuclear fuel will now be briefly described. The steps of the method may include interlocking a plurality of slotted plates 210 to form a fuel basket comprising a plurality of vertical exterior sidewalls 232A and a rectilinear grid array of a plurality of fuel assembly storage cells 240. The interlocked slotted plates 210 are configured such that the cantilevered lateral extensions 220 are formed which protrude outwards beyond the sidewalls 232A along the entire height of the fuel basket.

With the fuel basket 200 thus provided, the method continues with fixedly coupling a plurality of the vertically elongated reinforcement members directly to the lateral plate extensions 220 of the fuel basket. The reinforcement members may include reinforcement plates 250 and/or tubular shimming members 260. In one embodiment, the plates and shimming members are bolted to the lateral plate extensions 220 using bolts 250 previously described herein and extend for the full height of the fuel basket 200. The method may further include forming a gas flow path between the peripheral gaps G at the bottom of the fuel basket 200 and the interior fuel storage cells 240 by providing the flow cutouts 270 in the bottom end of some or all of the reinforcement plates 250 if used, tubular shimming members 260 if used, and the lateral plate extensions 220 of the lowermost tier of slotted plates 210 abutting the bottom closure plate 102. The reinforcement members structurally reinforce the fuel basket to protect the integrity of the fuel storage cells and fuel assemblies to be stored therein as previously described.

The reinforced fuel basket 200 is next inserted and slid through the open top end of the canister 100 into the cavity 104. The bottom closure lid 102 has already been hermetically seal welded onto the bottom end of the canister previously. The fuel basket becomes seated on the upward facing top surface of the bottom closure lid. One or more fuel assemblies 28 are then inserted into the storage cells 240 of the basket. The top closure lid 103 is then hermetically seal welded onto the top end of the canister 100 which completes the encapsulation of the fuel basket and fuel assembly (see, e.g. FIGS. 13A-B. The canister 100 may then be filled with an inert gas (e.g. helium, nitrogen, etc.) which begins to flow in the gas recirculation circuit within the canister driven by the natural convective thermo-siphon as the gas is heated by the fuel assemblies 28.

Numerous advantages can be realized with the present fuel basket integral shimming system embodiments disclosed herein, which can be summarized as including but not limited to the following.

The bottom edges of the slotted plates 210, lateral plate extensions 220, reinforcement plates 250 if provided, and tubular shim members 260 if provided may include flow cutouts 270 as previously described herein to enable inert gas (e.g. helium or other) recirculation by the natural gravity-driven thermosiphon action. It bears particular note that not all of these components require flow cutouts depending on their location and orientation within the fuel canister 100 in relation to the peripheral gaps G which collectively form the downcomer of the inert gas recirculation system within the canister.

The cross sectional area of the open peripheral spaces or gaps G around the perimeter of the fuel basket 200, which serve as the downcomer for the recirculating gas, is maximized by limited use of tubular shims fixedly attached to the slotted plate extensions 220 which helps boost the convective heat transfer to the canister shell wall and cooling of the fuel assemblies in the basket.

Each slotted plate extension 220 serves as a heat transfer extended surface ("fin") projecting laterally outwards from the prismatic fuel basket 200 to enhance dissipation of heat emitted by the fuel assemblies in the basket to the peripheral gaps and in turn to the canister shell 101. These heat transfer fins or extended surfaces aid in helping to draw the waste heat from the interior of the basket and transferring the heat to the recirculating inert gas flowing downwards through in the downcomer space defined by the peripheral gaps G internal to the canister 100.

The flow holes or cutouts 270 provide a direct line of sight between the bottom of the stored fuel and the bottom region of the fuel storage canister shell 100 which helps maximize radiative heating of the bottom region of the canister fuel confinement boundary and thus alleviate the risk of stress corrosion cracking of the canister which can occur under the right environmental conditions; a well known phenomenon and failure mechanism in the art.

The need to weld the exterior peripheral basket slotted panels or plates 210 together is eliminated by bolting the reinforcement members (e.g. reinforcement plates 250 and/or tubular shimming members 260) to the fuel basket lateral plate extensions 220, thereby enabling the assembled basket to be entirely weld-free and thus of high dimensional fidelity. This significantly reduces fabrication times and costs. The reinforcement members structurally ties the upper and lowest slotted plates 210 together to lock the entire vertical stack of plates into a structurally stable assemblage.

The reinforcement plates 250 and tubular shim members 260, which extend all the down to the bottom edge of the fuel basket 200, help to strengthen and stiffen the basket against axial inertial loads during any postulated vertical drop event as well as against any related laterally-acting inertial radial loads (if basket dropped partially on its side). During such a vertical drop event, the axial impact forces are transmitted between the bottom closure lid of the canister 100 to the opposite end top closure lid via the vertically-extending reinforcement plates and shim members.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A nuclear fuel storage system comprising:
   a canister comprising a cylindrical shell extending along a vertical centerline;
   a fuel basket positioned in the canister, the fuel basket formed by a plurality of orthogonally arranged and interlocked slotted plates which collectively define exterior side surfaces of the fuel basket;
   the fuel basket comprising a plurality of interior cells being defined by the slotted plates, each interior cell configured to hold a fuel assembly comprising spent nuclear fuel;
   at least some of the slotted plates comprising cantilevered plate extensions, the plate extensions protruding laterally beyond the exterior side surfaces of the fuel basket and defining peripheral gaps between the fuel basket and the canister;
   wherein the plate extensions are configured to engage the shell of the canister.

2. The system according to claim 1, wherein the lateral plate extensions define vertical edges which terminate proximate to an interior surface of the canister.

3. The system according to claim 2, wherein the vertical edges are linearly straight from top to bottom.

4. The system according to claim 1, further comprising a plurality of vertically elongated reinforcement members inserted in the peripheral gaps formed between the exterior side surfaces of the fuel basket and the shell of the canister, the reinforcement members fixedly coupled to the fuel basket.

5. The system according to claim 4, wherein the reinforcement members are fixedly coupled to the plate extensions at the upper end of the fuel basket, the lower end of the fuel basket, and in between.

6. The system according to claim 5, wherein the reinforcement members have a height which is coextensive with a full height of the fuel basket.

7. The system according to claim 6, wherein the reinforcement members comprise vertically elongated reinforcement plates extending for a full height of the fuel basket.

8. The system according to claim 7, wherein the reinforcement plates being arranged in pairs on the plate extensions of the fuel basket, the plate extensions being sandwiched between the pairs of the reinforcement plates.

9. The system according to claim 8, wherein the pairs of reinforcement plates are bolted to the plate extensions by bolts which pass through the reinforcement plates and plate extensions.

10. The system according to claim 9, wherein each pair of the reinforcement plates is bolted to a respective plate extension proximate to a top end of the fuel basket by a plurality of the bolts and proximate to a bottom end of the fuel basket by a plurality of bolts.

11. The system according to claim 7, wherein the reinforcement plates have a straight strap-like shape.

12. The system according to claim 7, wherein the reinforcement plates have an angled shape.

13. The system according to claim 1, wherein the reinforcement members each further comprise a flow cutout formed in a bottom end of the reinforcement members.

14. The system according to claim 1, wherein the plate extensions of the fuel basket each further comprise a flow cutout formed in a bottom end of the plate extensions.

15. The system according to claim 14, wherein the peripheral gaps form a flow downcomer and the interior cells form a riser which is in fluid communication via the flow cutouts to form a natural convective thermos-siphon flow recirculation circuit.

16. The system according to claim 15, further comprising an inert gas contained in the canister which circulates through the flow recirculation circuit.

17. The system according to claim 7, wherein the reinforcement members further comprise a plurality of vertically elongated tubular shim members positioned in some of the peripheral gaps, the tubular shim members each being fixedly coupled to a respective plate extension of the fuel basket.

18. The system according to claim 17, wherein the tubular shim members are bolted to the respective plate extensions.

19. The system according to claim 18, wherein the tubular shim members are bolted to the plate extensions by bolts which pass through the tubular shim members, plate extensions, and one of the reinforcement plates.

20. The system according to claim 18, wherein the tubular shim members are positioned in the peripheral gaps which do not contain a reinforcement plate.

21. A nuclear fuel storage system comprising:
a canister comprising a cylindrical shell extending along a vertical centerline;
a fuel basket positioned in the canister, the fuel basket defining a grid array of interior cells each of which is configured to hold a fuel assembly comprising spent nuclear fuel;
the fuel basket comprising a plurality cantilevered plate extensions, the plate extensions protruding laterally beyond vertical exterior side surfaces of the fuel basket and defining peripheral gaps between the fuel basket and the canister; and
a plurality of vertically elongated reinforcement members positioned in the peripheral gaps, the reinforcement members each being fixedly coupled to the plate extensions.

22. The system according to claim 21, wherein the reinforcement members comprise elongated reinforcement plates of straight or angular configuration extending for a full height of the fuel basket, each reinforcement member being fixedly coupled to a respective plate extension in one of the peripheral gaps.

23. The system according to claim 22, wherein the respective plate extensions are sandwiched between a pair of the reinforcement plates.

24. The system according to claim 22, wherein the reinforcement members further comprise a plurality of vertically elongated tubular shim members positioned in some of the peripheral gaps, the tubular shim members each being fixedly coupled to one side of a respective plate extension opposite to one of the reinforcement plates fixedly coupled to an opposite side of the respective plate extension.

* * * * *